US008362197B2

(12) United States Patent
Shindo et al.

(10) Patent No.: US 8,362,197 B2
(45) Date of Patent: *Jan. 29, 2013

(54) RESIN PARTICLE AND PROCESS FOR PRODUCTION THEREOF

(75) Inventors: Yasuhiro Shindo, Kyoto (JP); Sho Kim, Kyoto (JP)

(73) Assignee: Sanyo Chemical Industries, Ltd., Kyoto-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/991,596

(22) PCT Filed: May 20, 2009

(86) PCT No.: PCT/JP2009/002223
§ 371 (c)(1),
(2), (4) Date: Nov. 8, 2010

(87) PCT Pub. No.: WO2009/142010
PCT Pub. Date: Nov. 26, 2009

(65) Prior Publication Data
US 2011/0060110 A1 Mar. 10, 2011

(30) Foreign Application Priority Data

May 23, 2008 (JP) .................. 2008-135196
Dec. 22, 2008 (JP) .................. 2008-326570
Dec. 22, 2008 (JP) .................. 2008-326575

(51) Int. Cl.
*C08F 6/00* (2006.01)
(52) U.S. Cl. ............. 528/480; 528/272; 528/308.2; 528/481; 528/502 R; 528/503; 430/137.1; 430/137.18; 430/137.19; 525/437
(58) Field of Classification Search .......... 430/137.1, 430/137.18, 137.19; 528/480, 481, 486, 528/489, 491, 492, 493, 494, 495, 496, 497, 528/498, 499, 501, 502 R, 502 C, 503, 44, 528/86, 220, 230, 271, 272, 295.3, 308.1, 528/308.3, 310; 525/437
See application file for complete search history.

(56) References Cited

U.S. PATENT DOCUMENTS 3,967,962 A * 7/1976 O'Malley .............. 430/123.52
5,412,027 A 5/1995 Shine et al.
(Continued)

FOREIGN PATENT DOCUMENTS

JP 6-234861 A 8/1994
JP 8-176310 A 7/1996
(Continued)

OTHER PUBLICATIONS

Machine translation of JP 2006-321830.*
(Continued)

*Primary Examiner* — Frances Tischler
(74) *Attorney, Agent, or Firm* — Westerman, Hattori, Daniels & Adrian, LLP

(57) ABSTRACT

There is provided a method for producing a resin particle capable of unprecedentedly realizing both excellent heat resistant keeping property and melting property. The present invention is a method for producing a resin particle (X) comprising the step of treating a resin particle (B) containing a resin (A) composed of a crystalline part (a) containing, as an essential constitutional component, a polyester (p1) not containing an aromatic ring or a polyester (p2) containing an aromatic ring, and produced by polycondensation of a polyol component and a polycarboxylic acid component, and a non-crystalline part (b), with liquid or supercritical carbon dioxide (C), and removing (C), wherein a heat of fusion measured by differential scanning calorimetry (DSC) of the obtained (X) satisfies the following relational formula (1):

$$0 \leq H2/H1 \leq 0.9 \tag{1}$$

[in the relational formula (1), H1 represents a measurement value of a heat of fusion (J/g) at the time of the initial temperature elevation measured by DSC; and H2 represents a measurement value of a heat of fusion (J/g) at the time of the second temperature elevation measured by DSC].

12 Claims, 1 Drawing Sheet

U.S. PATENT DOCUMENTS

| | | | |
|---|---|---|---|
| 5,567,769 A | 10/1996 | Shine et al. | |
| 5,591,559 A * | 1/1997 | Odell | 430/137.19 |
| 6,099,778 A * | 8/2000 | Nelson et al. | 264/176.1 |
| 2003/0027066 A1 | 2/2003 | Yamashita et al. | |
| 2006/0115758 A1 | 6/2006 | Chang et al. | |
| 2006/0292476 A1 * | 12/2006 | Maehata et al. | 430/109.4 |
| 2008/0081274 A1 | 4/2008 | Goto et al. | |
| 2009/0011356 A1 | 1/2009 | Tomita et al. | |

FOREIGN PATENT DOCUMENTS

| | | |
|---|---|---|
| JP | 2004-226668 A | 8/2004 |
| JP | 2005-015589 A | 1/2005 |
| JP | 2005-107405 A | 4/2005 |
| JP | 2006-321830 A | 11/2006 |
| JP | 2007-277511 A | 10/2007 |
| WO | 2007/105737 A1 | 9/2007 |

OTHER PUBLICATIONS

International Search Report of PCT/JP2009/002223, mailing date Jul. 14, 2009.

European Search Report dated Jul. 26, 2011, issued in corresponding European Patent Application No. 10192186.

* cited by examiner

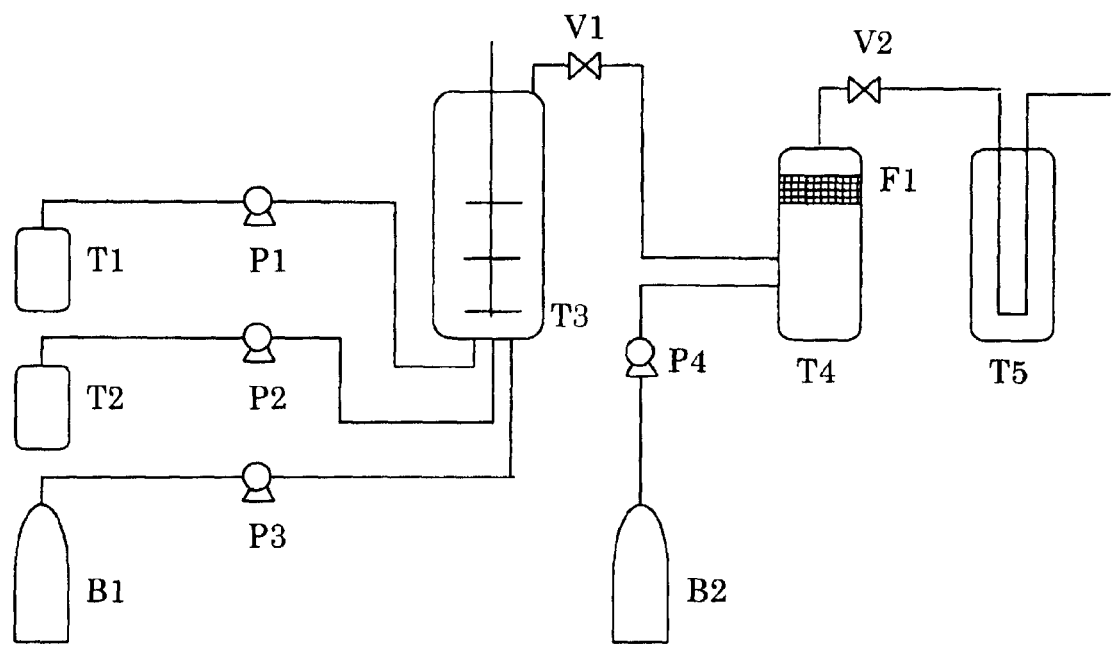

RESIN PARTICLE AND PROCESS FOR PRODUCTION THEREOF

TECHNICAL FIELD

The present invention relates to a resin particle and a method for producing the same.

BACKGROUND ART

Conventionally, as a method of forming a resin particle having high crystallinity, there are known a method of depositing a crystalline resin from an organic solvent (for example, see Patent Document 1), and a method of using a phase separation solvent (for example, see Patent Document 2).

PRIOR ART DOCUMENTS

Patent Documents

Patent Document 1: Japanese Patent Application Laid-Open (JP-A) No. 2005-15589
Patent Document 2: Japanese Patent Application Laid-Open (JP-A) No. Hei 8-176310

DISCLOSURE OF INVENTION

Problems to be Solved by the Invention

However, the resin particle obtained by the above method was insufficient in the point of realizing both a heat resistant keeping property and a melting property.

It is an object of the present invention to provide a method for producing a crystalline resin particle capable of unprecedentedly realizing both a heat resistant keeping property and a melting property.

Solution to the Problems

As a result of diligent efforts, the present inventors have found that both the heat resistant keeping property and the melting property of a resin particle can be achieved by a treatment with liquid or supercritical carbon dioxide, and have accomplished the present invention.

Specifically, the present invention includes the following four inventions.

(I) A method for producing a resin particle (X1) comprising the step of treating a resin particle (B1) containing a resin (A1) composed of a crystalline part (a1) containing, as an essential constitutional component, a polyester (p1) not containing an aromatic ring and produced by polycondensation of a polyol component and a polycarboxylic acid component, and a noncrystalline part (b), with liquid or supercritical carbon dioxide (C), and removing (C), wherein a heat of fusion measured by differential scanning calorimetry (DSC) of the obtained (X1) satisfies the following relational formula (1):

$$0 \leq H2/H1 \leq 0.9 \tag{1}$$

[in the relational formula (1), H1 represents a measurement value of a heat of fusion (J/g) at the time of the initial temperature elevation measured by DSC; and H2 represents a measurement value of a heat of fusion (J/g) at the time of the second temperature elevation measured by DSC].

(II) A method for producing a resin particle (X2) comprising the step of treating a resin particle (B2) containing a resin (A2) composed of a crystalline part (a2) containing, as an essential constitutional component, a polyester (p2) containing an aromatic ring and produced by polycondensation of a polyol component and a polycarboxylic acid component, and a noncrystalline part (b), with liquid or supercritical carbon dioxide (C), and removing (C), wherein a heat of fusion measured by differential scanning calorimetry (DSC) of the obtained (X2) satisfies the following relational formula (1):

$$0 \leq H2/H1 \leq 0.9 \tag{1}$$

[in the relational formula (1), H1 represents a measurement value of a heat of fusion (J/g) at the time of the initial temperature elevation measured by DSC; and H2 represents a measurement value of a heat of fusion (J/g) at the time of the second temperature elevation measured by DSC].

(III) A resin particle (X1) or (X2) obtained by the production method as described above.

(IV) An electrophotographic toner containing the resin particle (X1) or (X2) as described above.

Advantages of the Invention

The resin particle (X1) or (X2) obtained by the production method of the present invention is able to satisfy both the heat resistant keeping property and the melting property.

BRIEF DESCRIPTION OF THE DRAWING

FIG. 1A flow chart of an experiment device used for production of a resin particle in the present invention.

MODE FOR CARRYING OUT THE INVENTION

In the following, the present invention will be given a detailed description.

The first present invention is an invention concerning a method for producing a resin particle, comprising the steps of treating a resin particle (B1) containing a resin (A1) composed of a crystalline part (a1) containing, as an essential constitutional component, a polyester (p1) not containing an aromatic ring, and a noncrystalline part (b), with liquid or supercritical carbon dioxide (C) [hereinafter, sometimes referred to as carbon dioxide (C)], and then removing the carbon dioxide (C), to thereby obtain a resin particle (X1).

The second present invention is an invention concerning a method for producing a resin particle, comprising the steps of treating a resin particle (B2) containing a resin (A2) composed of a crystalline part (a2) containing, as an essential constitutional component, a polyester (p2) containing an aromatic ring, and a noncrystalline part (b), with liquid or supercritical carbon dioxide (C), and then removing the carbon dioxide (C), to thereby obtain a resin particle (X2).

In the following, the polyester (p1) not containing an aromatic ring or the polyester (p2) containing an aromatic ring is sometimes commonly referred to as a polyester (p), the crystalline part (a1) or the crystalline part (a2) is sometimes commonly referred to as a crystalline part (a), the resin (A1) or the resin (A2) is sometimes commonly referred to as a resin (A), the resin particle (B1) or the resin particle (B2) is sometimes commonly referred to as a resin particle (B), and the resin particle (X1) or the resin particle (X2) is sometimes commonly referred to as a resin particle (X) respectively.

In the present invention, it is necessary that the heat of fusion of the obtained resin particle (X) measured by differential scanning calorimetry (DSC) satisfies the following relational formula:

$$0 \leq H2/H1 \leq 0.9 \tag{1}$$

H1 represents a measurement value of a heat of fusion (J/g) at the time of the initial temperature elevation measured by DSC, and H2 represents a measurement value of a heat of fusion (J/g) at the time of the second temperature elevation measured by DSC.

Here, the measurement of the heat of fusion is conducted in accordance with JIS K7122 (1987) "Method of measuring heat of transition of plastic".

Specifically, a sample (5 mg) is collected and put into an aluminum pan, and the temperature of an endothermic peak due to melting [a melting point (m)] (° C.) can be determined by a differential scanning calorimeter (DSC) (for example, "RDC220 manufactured by SII NanoTechnology Inc.", "DSC20, manufactured by Seiko Instruments Inc." and the like) at a temperature elevation rate of 10° C. per minute. Also the heat of fusion can be determined from an area of the endothermic peak. After the initial temperature elevation, the temperature is cooled to 0° C. at a cooling rate of 90° C./minute prior to the second temperature elevation.

As shown in the relational formula (1), H2/H1 is 0 or more, preferably 0.01 or more, and more preferably 0.1 or more.

H2/H1 is 0.9 or less, preferably 0.85 or less, and more preferably 0.8 or less. More than 0.9 is not preferred because the heat resistant keeping property will be impaired.

The resin (A) contained in the resin particle (X) of the present invention is a resin composed of the crystalline part (a) containing, as an essential constitutional component, the polyester (p1) not containing an aromatic ring or the polyester (p2) containing an aromatic ring, and the noncrystalline part (b), and is concretely obtained by binding a resin constituting the crystalline part (a) and a resin constituting the noncrystalline part (b).

In the following, the resin constituting the crystalline part (a) will be described.

The resin constituting the crystalline part (a) is not particularly limited as far as it contains, as an essential constitutional component, the polyester (p1) not containing an aromatic ring or the polyester (p2) containing an aromatic ring, and has crystallinity. From the viewpoint of heat resistant keeping property, a melting point (m) is preferably 30 to 120° C., and more preferably 40 to 100° C.

Here, the melting point (m) means the temperature (° C.) of an endothermic peak due to melting at the time of initial temperature elevation, measured by a differential scanning calorimeter (DSC) in accordance with JIS K7122 (1987) "Method of measuring heat of transition of plastic" as is the case with the measurement method of the heat of fusion as described above.

The polyester (p1) not containing an aromatic ring used in the first present invention is obtained by polycondensation of a polyol component not containing an aromatic ring and a polycarboxylic acid component not containing an aromatic ring.

From the viewpoint of crystallinity, a polyester resin obtained by polycondensation of a diol (c1) not containing an aromatic ring and a dicarboxylic acid (e1) not containing an aromatic ring is preferred, and a tri- or more functional polyol (d1) not containing an aromatic ring and a tri- or more functional polycarboxylic acid (f1) not containing an aromatic ring may be used together as necessary.

Diol (c1) not containing an aromatic ring include a aliphatic diol (c11), a diol (c12) not containing an aromatic ring other than (c11), a diol (c13) having a carboxyl group, a diol (c14) having a sulfonic acid group or a sulfamic acid group and the like.

Aliphatic diol (c11) include a straight-chain aliphatic diol (c111), an aliphatic diol (c112) having a secondary hydroxyl group, and a branched aliphatic diol (c113).

The straight-chain aliphatic diol (c111) means a straight-chain aliphatic diol having a primary hydroxyl group in its molecular end, and include straight-chain aliphatic diols with 2 to 36 carbon atoms (for example, ethyleneglycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,20-eicosanediol).

Among these, in consideration of availability, straight-chain aliphatic diols with 2 to 10 carbon atoms (ethyleneglycol, 1,3-propanediol, 1,4-butanediol, 1,5-pentanediol, 1,6-hexanediol, 1,9-nonanediol, 1,10-decanediol and the like) are preferred.

Aliphatic diol (c112) having a secondary hydroxyl group include aliphatic diols having a secondary hydroxyl group with 2 to 36 carbon atoms (for example, 1,2-propyleneglycol) and the like are recited. As the branched aliphatic diol (c113), branched aliphatic diols with 2 to 36 carbon atoms (for example, neopentylglycol, and 2,2-diethyl-1,3-propanediol) and the like.

Diol (c12) not containing an aromatic ring other than the aliphatic diol (c11) include alkylene ether glycols with 4 to 36 carbon atoms (for example, diethylene glycol, triethylene glycol, dipropylene glycol, polyethylene glycol, polypropylene glycol, polytetramethylene ether glycol), alicyclic diols with 4 to 36 carbon atoms (for example, 1,4-cyclohexanedimethanol, hydrogenated bisphenol A), alkylene oxide (hereinafter, abbreviated as AO) [ethylene oxide (hereinafter, abbreviated as EO), propylene oxide (hereinafter, abbreviated as PO), butylene oxide (hereinafter, abbreviated as BO) and the like] adducts of the alicyclic diols as described above (added mole number 1 to 30), polybutadienediol and the like.

Diol (c13) having a carboxyl group include dialkylolalkanoic acids with 6 to 24 carbon atoms [for example, 2,2-dimethylolpropionic acid (DMPA), 2,2-dimethylolbutanoic acid, 2,2-dimethylolheptanoic acid, 2,2-dimethyloloctanoic acid].

Diol (c14) having a sulfonic acid group or a sulfamic acid group include 3-(2,3-dihydroxypropoxy)-1-propanesulfonic acid, sulfoisophthalic acid di(ethylene glycol)ester, sulfamic acid diols[N,N-bis(2-hydroxyalkyl)sulfamic acid (1 to 6 carbon atoms in the alkyl group) or its AO adduct (EO, PO or the like as AO, mole number of added AO: 1 to 6): for example, N,N-bis(2-hydroxyethyl)sulfamic acid, and N,N-bis(2-hydroxyethyl)sulfamic acid PO 2 mol adduct], and bis(2-hydroxyethyl)phosphate and the like are recited.

As a neutralized base of these diols, for example, tertiary amines with 3 to 30 carbon atoms (triethylamine, and the like) and/or alkaline metals (sodium salt, and the like).

Tri- or more functional polyol (d1) not containing an aromatic ring include tri to octa- or more polyvalent aliphatic alcohols with 3 to 36 carbon atoms (alkane polyol and an intramolecular or intermolecular dehydration product thereof, for example, glycerin, trimethylolethane, trimethylolpropane, pentaerythritol, sorbitol, sorbitan, polyglycerin, and the like), saccharides and derivatives thereof (for example, sucrose, and methylglycoside), and acrylpolyols [for example, copolymers of hydroxyethyl(meth)acrylate and other nonaromatic vinyl monomer] and the like.

As the polyol component, the content of the straight-chain aliphatic diol (c111) is preferably 80 mol % or more, more preferably 90 mol % or more of the polyol component. When the content of (c111) is 80 mol % or more, the crystallinity of the polyester resin is improved, and the melting point elevates, so that excellent heat resistant keeping property is realized.

Dicarboxylic acid (e1) include aliphatic dicarboxylic acids with 4 to 36 carbons (succinic acid, adipic acid, sebacic acid, azelaic acid, dodecane dicarboxylic acid, octadecanedicarboxylic acid, decylsuccinic acid, and the like), alicyclic dicarboxylic acids with 6 to 40 carbon atoms [dimmer acids (dimerized linoleic acid), and the like], alkenedicarboxylic acids with 4 to 36 carbon atoms (alkenylsuccinic acids such as dodecenylsuccinic acid, pentadecenylsuccinic acid and octadecenylsuccinic acid, maleic acid, fumaric acid, citraconic acid, and the like) and the like are.

Polycarboxylic acid (f1) include aliphatic or alicyclic polycarboxylic acids with 6 to 36 carbon atoms (hexanetricarboxylic acid, and the like), and the like.

As (e1) and (f1), acid anhydrides or lower alkyl esters with 1 to 4 carbon atom(s) (methyl ester, ethyl ester, isopropyl ester, and the like) of those described above may be used.

Among these polycarboxylic acid components, from the viewpoints of crystallinity and availability, aliphatic dicarboxylic acids are preferred, and straight-chain aliphatic dicarboxylic acids (adipic acid, sebacic acid and dodecane dicarboxylic acid, and the like) are more preferred.

Preferred specific examples of the polyester (p1) not containing an aromatic ring include a polycondensate of 1,4-butanediol and sebacic acid, a polycondensate of 1,6-hexanediol and dodecane dicarboxylic acid, a polycondensate of 1,6-hexanediol and sebacic acid, a polycondensate of 1,10-decanediol and adipic acid, a polycondensate of 1,4-butanediol and dodecane dicarboxylic acid, and a polycondensate of ethyleneglycol and dodecane dicarboxylic acid.

The polyester (p2) containing an aromatic ring used in the second present invention is obtained by polycondensation of a polyol component and a polycarboxylic acid component, and at least one of the polyol component and the polycarboxylic acid component contains an aromatic ring. From the viewpoint of crystallinity, a polyester resin obtained by polycondensation of a diol (c) and a dicarboxylic acid (e) is preferred, and a tri- or more functional polyol (d) and a tri- or more functional polycarboxylic acid (f) may be used together as necessary.

Diol (c) include the above diol (c1) not containing an aromatic ring, and the diol (c2) containing an aromatic ring.

(c2) include AO [EO, PO, BO, and the like] adducts (added mole number 2 to 30) of bisphenols (bisphenol A, bisphenol F, bisphenol S, and the like), and the like.

Tri- or more functional polyol (d) include the above tri- or more functional polyol (d1) not containing an aromatic ring, and the polyol (d2) containing an aromatic ring.

(d2) include AO adducts (added mole number 2 to 30) of tris phenols (tris phenol PA, and the like), AO adducts (added mole number 2 to 30) of novolac resins (phenol novolac, cresol novolac, and the like), acrylpolyols [copolymers of hydroxyethyl(meth)acrylate and other vinyl monomer, and the like], and the like.

As the polyol component constituting (p2), the content of the straight-chain aliphatic diol (c111) is preferably 70 mol % or more, and more preferably 80 mol % or more of the polyol component.

When the content of (c111) is 70 mol % or more, the crystallinity of the polyester resin is improved, and the melting point elevates, so that excellent heat resistant keeping property is realized.

Dicarboxylic acid (e) include the above dicarboxylic acid (e1) not containing an aromatic ring and the dicarboxylic acid (e2) containing an aromatic ring.

(e2) include aromatic dicarboxylic acids with 8 to 36 carbon atoms (phthalic acid, isophthalic acid, terephthalic acid, t-butylisophthalic acid, 2,6-naphthalenedicarboxylic acid, 4,4'-biphenyldicarboxylic acid, and the like) and the like.

Polycarboxylic acid (f) include the above dicarboxylic acid (f1) not containing an aromatic ring and the dicarboxylic acid (f2) containing an aromatic ring.

(f2) include aromatic polycarboxylic acids with 9 to 20 carbon atoms (trimellitic acid, pyromellitic acid, and the like) and the like.

Those preferred as the polyester (p2) containing an aromatic ring are polyesters obtained by polycondensation of the straight-chain aliphatic diol (c111) and the aromatic dicarboxylic acid with 8 to 36 carbon atoms, polyesters obtained by polycondensation of the straight-chain aliphatic diol (c111) with 2 to 36 carbon atoms and the straight-chain aliphatic dicarboxylic acid with 4 to 36 carbon atoms, and the aromatic dicarboxylic acid with 8 to 36 carbon atoms, and polyesters obtained by polycondensation of the straight-chain aliphatic diol (c111) and an AO adduct of bisphenols and the straight-chain aliphatic dicarboxylic acid with 4 to 36 carbon atoms.

Preferred specific examples thereof include a polycondensate of 1,5-pentanediol and terephthalic acid and isophthalic acid, a polycondensate of 1,10-decanediol and terephthalic acid, a polycondensate of 1,6-hexanediol and terephthalic acid and adipic acid, a polycondensate of 1,10-decanediol and terephthalic acid and dodecane dicarboxylic acid, a polycondensate of 1,6-hexanediol and a bisphenol A•EO 2 mol adduct and dodecane dicarboxylic acid, and a polycondensate of 1,4-butanediol and a bisphenol A•EO 2 mol adduct and sebacic acid.

The molecular weight of the polyester (p) is preferably the weight average molecular weight (Mw) determined by gel permeation chromatography (GPC) of 2000 to 80000. The glass transition temperature (Tg) is preferably $-100$ to $40°$ C., and more preferably $-80$ to $0°$ C. The melting point (m) is preferably 40 to $100°$ C.

The resin constituting the crystalline part (a) is not particularly limited as far as it contains, as an essential constitutional component, the polyester (p) [polyester (p1) not containing an aromatic ring or polyester (p2) containing an aromatic ring] and has crystallinity, and may be the polyester (p) itself or a composite resin with other resins having crystallinity.

As the other resin having crystallinity in the case of the composite resin, a polyurethane resin, a polyamide resin and a polyurea resin are preferred because of easiness of introduction of blocks.

The crystalline polyurethane resin is preferably a polyurethane resin synthesized from a polyol component containing the diol (c) and a polyisocyanate component containing a diisocyanate (g). However, if necessary, the tri- or more functional polyol (d) may be used together as the polyol component, and a tri- or more functional polyisocyanate (h) may be used together as the polyisocyanate component.

The crystalline polyamide resin is preferably a polyamide resin synthesized from a polyamine containing a diamine (i) and a polycarboxylic acid component containing the dicarboxylic acid (e). However, if necessary, a tri- or more functional polyamine (j) maybe used together as the polyamine component, and the tri- or more functional polycarboxylic acid (f) may be used together as the polycarboxylic acid component.

The crystalline polyurea resin is preferably a polyurea resin synthesized from a polyamine containing the diamine (i) and a polyisocyanate component containing the diisocyanate (g). However, if necessary, a tri- or more functional polyamine (j) may be used together as the polyamine component, and the tri- or more functional polyisocyanate (h) may be used together as the polyisocyanate component.

In the following, the polyol component, the polycarboxylic acid component, the polyisocyanate component, and the polyamine component (including those having tri or more functions) used in the crystalline polyurethane resin, the crystalline polyamide resin, and the crystalline polyurea resin will be described.

Polyol component include those similar to the polyol component constituting the above polyester (p2) containing an aromatic ring, and preferred ones are also similar.

Polycarboxylic acid component include those similar to the polycarboxylic acid component constituting the above polyester (p2) containing an aromatic ring, and preferred ones are also similar.

Among the polyisocyanate components, diisocyanate (g) include aromatic diisocyanates with 6 to 20 carbon atoms (excluding carbon atoms in the NCO group, the same applies hereinafter), aliphatic diisocyanates with 2 to 18 carbon atoms, alicyclic diisocyanates with 4 to 15 carbon atoms, araliphatic diisocyanates with 8 to 15 carbon atoms, and modified compounds of these diisocyanates (urethane group-, carbodiimide group-, allophanate group-, urea group-, biuret group-, urethodione group-, urethoimine group-, isocyanurate group-, and oxazolidone group-containing modified compounds, and the like) and mixtures of two or more kinds of these. The tri- or more functional (tri to octa- or more valent) polyisocyanate (h) may be used together as necessary.

Specific examples of the aromatic diisocyanates and the tri- or more valent aromatic polyisocyanates include 1,3- and/or 1,4-phenylenediisocyanate, 2,4- and/or 2,6-tolylene diisocyanate (TDI), crude TDI, 2,4'- and/or 4,4'-diphenylmethane diisocyanate (MDI), crude MDI, 1,5-naphthylene diisocyanate, 4,4',4"-triphenylmethane triisocyanate, and the like.

Specific examples of the aliphatic diisocyanates and the tri- or more valent aliphatic polyisocyanates include ethylene diisocyanate, tetramethylene diisocyanate, hexamethylene diisocyanate (HDI), dodecamethylene diisocyanate, 1,6,11-undecane triisocyanate, lysine diisocyanate, 2,6-diisocyanatomethylcaproate, bis(2-isocyanatoethyl) fumarate, and the like.

Specific examples of the alicyclic diisocyanates and the tri- or more valent alicyclic polyisocyanates include isophorone diisocyanate (IPDI), dicyclohexyl methane-4,4'-diisocyanate (hydrogenated MDI), cyclohexylene diisocyanate, methylcyclohexylene diisocyanate (hydrogenated TDI), bis(2-isocyanatoethyl)-4-cyclohexene-1,2-dicarboxylate, 2,5- and/or 2,6-norbornane diisocyanate, and the like.

Specific examples of the araliphatic diisocyanates and the tri- or more valent araliphatic polyisocyanates include m- and/or p-xylylene diisocyanate (XDI), α,α,α',α'-tetramethylxylylene diisocyanate (TMXDI), and the like.

Among these polyisocyanate components, aromatic diisocyanates with 6 to 15 carbon atoms, aliphatic diisocyanates with 4 to 12 carbon atoms, and alicyclic diisocyanates with 4 to 15 carbon atoms are preferred, and TDI, MDI, HDI, hydrogenated MDI, and IPDI are particularly preferred.

With respect to examples of the polyamine components [diamine(i) and tri- or more functional polyamine (j)], aliphatic diamines (C2 to C18) include;

[1] aliphatic diamines {C2 to C6 alkylene diamines (ethylenediamine, propylenediamine, trimethylenediamine, tetramethylene diamine, hexamethylenediamine, and the like), polyalkylene (C2 to C6)diamines [diethylenetriamine, iminobispropylamine, bis(hexamethylene)triamine, triethylenetetramine, tetraethylenepentamine, pentaethylenehexamine, and the like]};

[2] alkyl (C1 to C4) or hydroxyalkyl (C2 to C4) substitution products thereof [dialkyl(C1 to C3)aminopropylamine, trimethylhexamethylenediamine, aminoethylethanolamine, 2,5-dimethyl-2,5-hexamethylenediamine, methyliminobispropylamine, and the like];

[3] alicyclic or heterocycle-containing aliphatic diamines {alicyclic diamines (C4 to C15) [1,3-diaminocyclohexane, isophorone diamine, menthene diamine, 4,4'-methyldicyclohexanediamine (hydrogenated methylenedianiline), and the like], heterocyclic diamines (C4 to C15)[piperazine, N-aminoethylpiperazine, 1,4-diaminoethylpiperazine, 3,9-bis(3-aminopropyl)-2,4,8,10-tetraoxaspiro[5,5]undecane, and the like];

[4] aromatic ring-containing aliphatic amines (C8 to C15) (xylylenediamine, tetrachloro-p-xylylenediamine, and the like) and the like.

Aromatic diamines (C6 to C20) include;

[1] unsubstituted aromatic diamines [1,2-, 1,3- and 1,4-phenylenediamines, 2,4'- and 4,4'-diphenylmethanediamines, crude diphenylmethanediamine(polyphenylpolymethylenepolyamine), diaminodiphenylsulfone, benzidine, thiodianiline, 2,6-diaminopyridine, m-aminobenzylamine, triphenylmethane-4,4',4"-triamine, naphthylenediamine, and the like;

[2] aromatic diamines having nuclear-substituted alkyl groups [C1 to C4 alkyl groups such as methyl, ethyl, n- and i-propyl and butyl, for example, 2,4- and 2,6-tolylene diamines, crude tolylene diamine, diethyltolylene diamine, 4,4'-diamino-3,3'-dimethyldiphenylmethane, 4,4'-bis(o-toluidine), dianisidine, diaminoditolylsulfone, 1,3-dimethyl-2,4-diaminobenzene, 2,3-dimethyl-1,4-diaminonaphthalene, 4,4'-diamino-3,3'-dimethyldiphenylmethane, and the like], and mixtures of these isomers in various ratios;

[3] aromatic diamines having nuclear-substituted electron-withdrawing groups (halogens such as Cl, Br, I and F; alkoxy groups such as methoxy and ethoxy; a nitro group and the like) [methylenebis-o-chloroaniline, 4-chloro-o-phenylenediamine, 2-chloro-1,4-phenylenediamine, 3-amino-4-chloroaniline, 4-bromo-1,3-phenylenediamine, 2,5-dichloro-1,4-phenylenediamine, 5-nitro-1,3-phenylenediamine, 3-dimethoxy-4-aminoaniline, and the like]; and

[4] aromatic diamines having a secondary amino group [—$NH_2$ of the aromatic diamines of the above [1] to [3] is partially or entirely replaced by —NH—R' (R' is an alkyl group, for example, a lower alkyl group such as methyl and ethyl)] [4,4'-di(methylamino)diphenylmethane, 1-methyl-2-methylamino-4-aminobenzene, and the like].

Polyamine components include, besides those recited above, polyamide polyamines [low molecular weight polyamide polyamines obtainable by condensation of dicarboxylic acids (dimmer acid, and the like) and excess (2 mol or more per 1 mol of the acid) polyamines (the above alkylenediamine, polyalkylene polyamine, and the like) and the like], polyether polyamines [hydrogenated products of cyanoethylated compounds of polyether polyols (polyalkylene glycol, and the like), and the like] and the like.

The percentage of the polyester (p) in the resin constituting the crystalline part (a) is preferably 20% by weight or more, more preferably 30% by weight or more, and particularly preferably 40 to 95% by weight.

In a method of binding the polyester (p) with the crystalline polyurethane resin, the crystalline polyurea resin, and the crystalline polyamide resin, whether a binder (coupling agent) is used or not is selected in consideration of the reactivity of the functional group contained therein, and when a binder is used, a binder suited for the contained functional group may be selected, and these resins are allowed to bind, to produce a composite resin.

When a binder is not used in production of a composite resin, the reaction between the functional group contained in the polyester (p) and the functional groups contained in other polyester resins, polyurethane resins, polyurea resins, and polyamide resins is allowed to proceed while heating and pressure reduction are effected as necessary. Particularly, for the reaction in which the end functional groups are the carboxyl group and the hydroxyl group, and the reaction in which the end functional groups are the carboxyl group and the amino group, the reactions will proceed smoothly when the acid value of one resin is high, and the hydroxyl group value or the amine value of the other resin is high. The reaction temperature is preferably 180° C. to 230° C.

When a binder is used, various binders may be used in accordance with the kind of the end functional group.

By conducting a dehydration reaction or an addition reaction using a polyvalent carboxylic acid, a polyhydric alcohol, a polyvalent isocyanate, an acid anhydride, a polyfunctional epoxy, and the like, the crystalline part (a) which is a composite resin is obtained.

Polyvalent carboxylic acid and the acid anhydride include those recited for the above polycarboxylic acid component. Polyhydric alcohol include those recited for the above polyol component. Polyvalent isocyanate include those recited for the above polyisocyanate component.

Polyfunctional epoxy include bisphenol A type and -F type epoxy compounds, phenol novolac-type epoxy compounds, cresol novolac-type epoxy compounds, hydrogenated bisphenol A-type epoxy compounds, diglycidylethers of AO adducts of bisphenol A or -F, diglycidylethers of AO adducts of hydrogenated bisphenol A, diglycidylethers of diols (ethyleneglycol, propyleneglycol, neopentylglycol, butanediol, hexanediol, cyclohexane dimethanol, polyethyleneglycol and polypropyleneglycol, and the like), trimethylolpropane di and/or triglycidylethers, pentaerythritol tri and/or tetra glycidyl ethers, sorbitol hepta and/or hexa glycidyl ethers, resorcin diglycidyl ether, dicyclopentadiene-phenol addition type glycidyl ether, methylene bis(2,7-dihydroxynaphthalene)tetraglycidyl ether, 1,6-dihydroxynaphthalenediglycidyl ether, polybutadiene diglycidyl ether, and the like.

Among methods of producing a composite resin, as an example of the dehydration reaction, when both the polyester (p), and the other crystalline resin forming the composite resin have hydroxyl groups, a reaction of binding these hydroxyl groups by means of a binder (for example, polyvalent carboxylic acid) is recited. In this case, for example, the reaction is conducted at a reaction temperature of 180° C. to 230° C. in the absence of a solvent, to obtain the crystalline part (a) which is a composite resin.

As an example of the addition reaction, when both the polyester (p), and the other crystalline resin forming the composite resin have hydroxyl groups in their terminals, a reaction of binding these hydroxyl groups by means of a binder (for example, polyvalent carboxylic acid) is recited, and in the case of a resin in which either one of the polyester (p) and the other crystalline resin forming the composite resin has a hydroxyl group in its terminal and the other has an isocyanate group in its terminal, a reaction of binding these groups without using a binder is recited. In this case, for example, both the polyester (p) and the other crystalline resin forming the composite resin are dissolved in a solvent capable of dissolving both of them, and a binder is added thereto as is necessary, and the reaction is conducted at a reaction temperature of 80° C. to 150° C., to obtain the crystalline part (a) which is a composite resin.

Resin constituting the noncrystalline part (b) include polyester resins (including lactone ring-opening polymers), polyurethane resins, polyurea resins, polyamide resins, polystyrene resins, styrene acrylic polymers, and the like.

Among these, polyester resins (including lactone ring-opening polymers), polyurethane resins, polyurea resins, polyamide resins, and composite resins thereof are preferred, and polyurethane resins and polyester resins are further preferred.

Likewise the crystalline part (a) as described above, the polyester resin is preferably a polyester resin synthesized from a polyol component containing the diol (c) and a polycarboxylic acid component containing the dicarboxylic acid (e). However, the tri- or more functional polyol (d) as the polyol component, and the tri- or more functional polycarboxylic acid (f) as the polycarboxylic acid component may be used together as necessary.

The polyurethane resin is preferably a polyurethane resin synthesized from a polyol component containing the diol (c) and a polyisocyanate component containing the diisocyanate (g). However, the tri- or more functional polyol (d) as the polyol component, and the tri- or more functional polyisocyanate (h) as the polyisocyanate component may be used together as necessary.

The polyurea resin is preferably a polyurea resin synthesized from a polyamine containing the diamine (i) and a polyisocyanate component containing the diisocyanate (g). However, the tri- or more functional polyamine (j) as the polyamine component, and the tri- or more functional polyisocyanate (h) as the polyisocyanate component maybe used together as necessary.

The polyamide resin is preferably a polyamide resin synthesized from a polyamine containing the diamine (i) and a polycarboxylic acid component containing the dicarboxylic acid (e). However, the tri- or more functional polyamine (j) as the polyamine component, and the tri- or more functional polycarboxylic acid (f) as the polycarboxylic acid component may be used together as necessary.

As the monomers constituting the noncrystalline polyester resins, the noncrystalline polyurethane resins, the noncrystalline polyamide resins, and the noncrystalline polyurea resins include those similar to those shown as the specific examples of the above polyol component, the above polycarboxylic acid component, the above polyisocyanate component, and the above polyamine component, and any combination is applicable as far as the noncrystalline resin is formed.

The glass transition temperature (Tg) of the resin constituting the noncrystalline part (b) is preferably 40 to 250° C., more preferably 50 to 240° C., and particularly preferably 60 to 230° C. from the viewpoint of heat resistant keeping property.

Here, the glass transition temperature is measured by using a differential scanning calorimeter (DSC) (for example, DSC20, manufactured by Seiko Instruments Inc., RDC220 manufactured by SII NanoTechnology Inc., and the like) in accordance with JIS K7122 (1987) "Method of measuring transition heat of plastic".

For binding of the resin constituting the crystalline part (a) and the resin constituting the noncrystalline part (b), whether a binder (coupling agent) is used or not is selected in consideration of the reactivity of the respective end functional groups of the resins constituting (a) and (b), and when a binder is used, a binder suited for the end functional groups is selected, and (a) and (b) are allowed to bind, to produce the resin (A) which is a block polymer.

In the above method, when a mixture of the resin (A) and unreacted (a) and/or (b) [preferably mixture of (A) and (a)] is obtained, the mixture may be directly used for a production method of a resin particle according to the present invention.

When a binder is not used, the reaction between the end functional group of the resin forming (a) and the end functional group of the resin forming (b) is allowed to proceed while heating and pressure reduction are effected as necessary. Particularly, for the reaction in which the end functional groups are the carboxyl group and the hydroxyl group, and the reaction in which the end functional groups are the carboxyl group and the amino group, the reactions will proceed smoothly when the acid value of one resin is high, and the hydroxyl group value or the amine value of the other resin is high. The reaction temperature is preferably 180° C. to 230° C.

When a binder is used, various binders may be used in accordance with the kind of the end functional group.

By conducting a dehydration reaction or an addition reaction using a polyvalent carboxylic acid, a polyhydric alcohol, a polyvalent isocyanate, an acid anhydride, a polyfunctional epoxy, and the like, the crystalline part (a) and the noncrystalline part (b) are bound together, so that the resin (A) is obtained.

As specific examples of these binder and binding method, those described above are recited.

The resin (A) composed of the crystalline part (a) and the noncrystalline part (b) is preferably a crystalline resin, and has a melting point (m) of preferably 40° C. or higher, more preferably 50° C. or higher, and particularly preferably 55° C. or higher from the viewpoint of heat resistant keeping property, and preferably 110° C. or less, more preferably 100° C. or less, and particularly preferably 90° C. or less from the viewpoint of melting property. Here, the melting point (m) is measured by the manner as described above.

The ratio (s/m) between the softening point (s) [° C.] and the melting point (m) [° C.] of the resin (A) is preferably 0.8 to 1.55, more preferably 0.8 to 1.2, and particularly preferably 0.85 to 1.15. Within these ranges, an image is less likely to be degraded in the application as a toner particle. The softening point (s) is a value measured in the following manner.

<Softening Point>

Using a descending type flow tester [for example, CFT-500D, manufactured by Shimadzu Corporation], 1 g of a measurement sample is pushed through a nozzle having a diameter of 1 mm and a length of 1 mm by application of a load of 1.96 M Pa by means of a plunger while it is heated at a temperature elevation rate of 6° C./minute, and a graph of "plunger descending amount (flow value)" and "temperature" is drawn, and a temperature corresponding to ½ of the maximum value of descending amount of the plunger is read from the graph, and the value (temperature at which a half of the measurement sample flows out) is determined as a softening point.

In the viscoelastic characteristics of the resin (A), it is preferred to satisfy the following Requirement 1, and more preferably to satisfy the following Requirement 1-2.

$$G'(m+20)=50 \text{ to } 1\times10^6 \text{ [Pa]} \qquad \text{[Requirement 1]}$$

$$G'(m+20)=100 \text{ to } 5\times10^5 \text{ [Pa]} \qquad \text{[Requirement 1-2]}$$

When G' at (m+20)° C. is 50 Pa or higher, hot offset is less likely to occur even at the time of fixation at low temperature, and a fixing temperature region is widened. When it is $1\times10^6$ [Pa] or less, the viscosity capable of fixing at low temperature is easy to be obtained, so that fixability at low temperature is improved.

The dynamic viscoelastic measurement values (storage elastic modulus G', loss elastic modulus G") are measured using a dynamic viscoelastic measuring apparatus RDS-2, manufactured by Rheometric Scientific at a frequency of 1 Hz. A measurement temperature ranges from 30° C. to 200° C., and by measuring the melt viscoelasticity within these temperatures, curves of temperature-G' and temperature-G" can be obtained.

The resin (A) satisfying [Requirement 1] can be obtained, for example, by adjusting the ratio of the crystalline component in the composition constituting (A) or by adjusting the resin molecular weight. For example, when the ratio of the crystalline part (a) or the ratio of the crystalline component is increased, the value of G'(m+20) decreases. Crystalline component include polyol, polyisocyanate and the like having a straight-chain structure. Also by decreasing the resin molecular weight, the value of G'(m+20) decreases.

The melting starting temperature (x) of the resin (A) is preferably within a temperature range of (m±20)° C. (m represents a melting point), more preferably within a temperature range of (m±15)° C., and particularly preferably within a temperature range of (m±10)° C. Specifically, (x) is preferably 30 to 100° C., and more preferably 40 to 80° C. The melting starting temperature (x) is a value measured in the following manner.

<Melting Starting Temperature>

Using a descending type flow tester {for example, CFT-500D, manufactured by Shimadzu Corporation}, 1 g of a measurement sample is pushed through a nozzle having a diameter of 1 mm and a length of 1 mm by application of a load of 1.96 M Pa by means of a plunger while it is heated at a temperature elevation rate of 6° C./minute, and a graph of "plunger dropping amount (flow value)" and "temperature" is drawn, and a temperature at which a piston clearly starts descending again after a slight elevation of the piston due to heat expansion of the sample is read from the graph, and the value is determined as a melting starting temperature.

Concerning the loss elastic modulus G" and the melting starting temperature (x), the resin (A) satisfies preferably [Requirement 2] shown below, more preferably [Requirement 2-2], particularly preferably [Requirement 2-3], and most preferably [Requirement 2-4].

$$|\text{Log } G''(x+20)-\text{Log } G''(x)|>2.0 \qquad \text{[Requirement 2]}$$

[G': storage elastic modulus [Pa], G": loss elastic modulus [Pa]]

$$|\text{Log } G''(x+20)-\text{Log } G''(x)|>2.5 \qquad \text{[Requirement 2-2]}$$

$$|\text{Log } G''(x+15)-\text{Log } G''(x)|>2.5 \qquad \text{[Requirement 2-3]}$$

$$|\text{Log } G''(x+10)-\text{Log } G''(x)|>2.5 \qquad \text{[Requirement 2-4]}$$

When the melting starting temperature (x) of the resin (A) falls within the above range, and satisfies the [Requirement 2], the rate of decrease in viscosity of the resin is high, so that it is possible to obtain the equivalent image quality on both the low temperature side and the high temperature side of the fixing temperature region in the application as a toner particle. Further, the time required to reach the fixable viscosity from the start of melting is short, so that it is advantageous in obtaining an excellent low temperature fixing property. [Requirement 2] is an index of the sharp melting property of a resin, namely how quickly and with how little heat the fixing is achieved, which is determined experimentally.

The resin (A) satisfying the preferred range of the melting starting temperature (x) and [Requirement 2] can be obtained, for example, by adjusting the ratio of the crystalline component in the constituting component of (A). For example, by increasing the ratio of the crystalline component, the temperature difference between (m) and (x) decreases.

In the viscoelastic characteristics of the resin (A), the ratio [G"(m+30)/G"(m+70)] between the loss elastic modulus G" at (m+30)° C. and the loss elastic modulus G" at (m+70)° C. is preferably 0.05 to 50, and more preferably 0.1 to 10 {m: melting point of (A)}.

By keeping the ratio of loss elastic modulus within the above range, more stable image quality in the fixing temperature region can be obtained in the application as a toner particle.

The resin (A) satisfying the above requirement of the ratio of G" can be obtained, for example, by adjusting the ratio of the crystalline component in the composition of (A) or the molecular weight of the crystalline part (a). For example, when the ratio of the crystalline part (a) or the ratio of the crystalline component is increased, the value of [G"(m+30)/G"(m+70)] decreases. When the molecular weight of crystalline part (a) is increased, the value of [G"(m+30)/G"(m+70)] decreases. As the crystalline component include polyol, polyisocyanate having a straight-chain structure, and the like.

The weight average molecular weight (Mw) of the resin (A) is preferably 5000 to 100000, more preferably 6000 to 80000, and particularly preferably 8000 to 50000 from the viewpoint of melting property.

The Mw of the crystalline part (a) constituting (A) is preferably 2000 to 80000, more preferably 3000 to 60000, and particularly preferably 4000 to 50000.

The Mw of the noncrystalline part (b) constituting (A) is preferably 500 to 50000, more preferably 750 to 20000, and particularly preferably 1000 to 10000.

The Mws of the crystalline part (a) and the noncrystalline part (b) are obtained by measuring the weight average molecular weight (Mw) of the resin constituting (a) and the weight average molecular weight (Mw) of the resin constituting (b), respectively, before binding. The (Mw) is measured in the following condition using gel permeation chromatography (GPC).

Apparatus (one example): HLC-8120 manufactured by TOSOH CORPORATION

Column (one example): TSK GEL GMH6×2 [manufactured by TOSOH CORPORATION]

Measurement temperature: 40° C.

Sample solution: 0.25% by weight of THF solution

Solution injection amount: 100 µL

Detector: Refraction index detector

Standard substance: 12 standard polystyrenes manufactured by TOSOH CORPORATION (TSK standard POLYSTYRENE) (Molecular weight: 500, 1050, 2800, 9100, 18100, 37900, 96400, 190000, 355000, 1090000, 2890000)

The percentage of the crystalline part (a) in the resin (A) is preferably 30 to 95% by weight, more preferably 40 to 90% by weight, and particularly preferably 50 to 85% by weight. Within these ranges, the crystallinity of the resin (A) is not impaired, and excellent heat resistant keeping property is realized.

The resin (A) is a block resin composed of the crystalline part (a) and the noncrystalline part (b), and each terminal of the product in which (a) and (b) are linearly bound in the following form is the resin of (a), and an average value n of the repeating number of {-(b)-(a)} unit is preferably 0.5 to 3.5, more preferably 0.7 to 2.0, and particularly preferably 0.9 to 1.5.

(a){-(b)-(a)}n

[(a) means (a1) or (a2)]

The above formula concretely means resins in which the crystalline part (a) and the noncrystalline part (b) are bound linearly in the forms of:

(a)[n=0], (a)-(b)-(a)[n=1], (a)-(b)-(a)-(b)-(a)[n=2], (a)-(b)-(a)-(b)-(a)-(b)-(a)[n=3], and the like, and a mixture thereof [excluding one formed only of n=0]. The expression including n=0 means that the resin constituting a crystalline part (a) is contained together with the resin (A).

When n is 3.5 or less, the crystallinity of the resin (A) is not impaired. When n is 0.5 or more, the elasticity of (A) after melting is excellent, and hot offset is less likely to occur during fixing, and fixing temperature region is further extended in the application as a toner. In addition, n is a calculated value determined from amounts of raw materials [a molar ratio between (a) and (b)] used. From the viewpoint of the degree of crystallinity of the resin (A), both terminals of (A) are preferably the crystalline parts (a).

When both terminals are the noncrystalline parts (b), it is preferred to make the ratio of the crystalline part (a) in (A) 75% by weight or more for imparting crystallinity to the resin (A) because the degree of crystallization is impaired.

In the present invention, by treating the resin particle (B) in liquid or supercritical carbon dioxide (C), and then removing the carbon dioxide (C), it is possible to obtain an objective resin particle (X). Here, the term treatment means dispersing the resin particle (B) in (C) and bringing it into contact with (C) for a certain time, thereby allowing (B) to swell. By conducting this treatment, it may sometimes be possible to modify the resin particle (B) having a ratio H2/H1 of 1 or more into an objective resin particle (X) having a ratio of 0.9 or less.

The above certain time [including the time required for formation of the resin particle (B)] is typically 10 seconds to 180 minutes, and preferably 30 seconds to 60 minutes.

The swelling occurs by permeation of carbon dioxide into the resin particle (B) by bringing the resin particle (B) into contact with the carbon dioxide (C) for a certain time. Therefore, the degree of swelling can be adjusted by the contacting time with (C), and the pressure and temperature of (C).

As a method of dispersing the resin particle (B) into (C), the following methods (1) to (4) are recited.

(1) A method of dispersing the resin (A) dissolved in a solvent (S) in (C), thereby obtaining a dispersion of the resin particle (B).

(2) A method of dispersing the molten resin (A) in (C), thereby obtaining a dispersion of the resin particle (B).

(3) A method of producing the resin particle (B) by an alternative method, and directly dispersing (B) in (C) by stirring, ultrasonic irradiation and the like.

(4) A method of dispersing the resin particle (B) produced by an alternative method in a solvent (T), and introducing the dispersion into (C).

In the dispersing methods of (1) and (2), it is preferred to use a microparticle (D) for dispersion. By dispersing (D) in (C), (D) adheres to a surface of (B), so that (B) can be stably dispersed in (C).

Among these methods, (1) is preferred from the viewpoint of ease of adjustment of the particle size of the resin particle and capability of reducing the particle size distribution (ratio Dv/Dn between a volume average particle size Dv and a number average particle size Dn).

Solvent (S) include, for example, ketone solvents (acetone, methylethylketone, and the like), ether solvents (tetrahydrofuran, diethylether, ethylene glycol monoalkyl ether, propylene glycol monoalkyl ether, cyclic ethers, and the like), ester solvents (acetic acid esters, pyruvic acid esters, 2-hydroxyisobutyric acid esters, lactic acid esters, and the like), amide solvents (dimethylformamide, and the like), alcohols (methanol, ethanol, fluorine-containing alcohols, and the like), aromatic hydrocarbon solvents (toluene, xylene, and the like), aliphatic hydrocarbon solvents (octane, decane, and the like) and the like. A mixed solvent of two or more kinds of these solvents, or a mixed solvent of such organic solvents and water may also be used.

From the viewpoint of removal of the solvent, mixed solvents (in particular, a mixed solvent of acetone, methanol and water, a mixed solvent of acetone and methanol, a mixed solvent of acetone and ethanol, and a mixed solvent of acetone and water) are preferred.

A solution (L) of the resin (A) is produced by dissolving the resin (A) in the solvent (S).

The viscosity at 40° C. of the solution (L) is preferably 10 to 1000000 mPa·s, more preferably 50 to 500000 mPa·s, and particularly preferably 100 to 200000 mPa·s. Within these ranges, the dispersibility of the resin particle (B) is improved.

The weight ratio of the resin (A) in the solution (L) is preferably 5 to 95% by weight, more preferably 10 to 90% by weight, and particularly preferably 15 to 85% by weight. Within these ranges, the resin particle (B) can be formed efficiently.

The microparticle (D) for dispersion used as necessary is not particular limited as far as the resin particle (B) can be dispersed, and examples thereof include inorganic microparticles (silica, titania, and the like), organic microparticles (acryl resins, polyester resins, and the like), and the like.

The volume average particle size of the microparticles (D) is not particularly limited as far as the resin particle (B) can be dispersed, and it is preferably 30 to 1000 nm, and more preferably 50 to 500 nm. Within these ranges, the dispersibility of the resin particle (B) in (C) is improved.

The weight ratio (% by weight) between the microparticle (D) and the resin particle (B) is not particularly limited, and it is preferably 0.1 to 20%, and more preferably 0.5 to 15% with respect to the resin particle (B). Within these ranges, the dispersibility of the resin particle (B) is improved.

As the microparticle (D), those that do not dissolve in (C) but are dispersed stably in (C) are preferred.

In the present invention, a method of dispersing the microparticle (D) in the carbon dioxide (C) may be any method, and for example, a method of charging (D) and (C) in a vessel, and dispersing (D) directly in (C) by stirring, ultrasonic irradiation, and the like, a method of introducing a dispersion liquid in which the microparticle (D) is dispersed in a solvent into (C), and the like are recited.

The above solvent include those similar to the solvent (S). From the dispersibility of the microparticle (D), aliphatic hydrocarbon solvents (decane, hexane, heptane, and the like), and ester solvents (ethyl acetate, butyl acetate, and the like) are preferred.

The weight ratio (% by weight) between the microparticle (D) and the solvent is not particularly limited, and the microparticle (D) is preferably 50 or less, more preferably 30 or less, and particularly preferably 20 or less, relative to the solvent. Within these ranges, the microparticle (D) can be introduced into (C) efficiently.

A method of dispersing microparticle (D) into the solvent is not particularly limited, and a method of charging the microparticle (D) in a solvent, and directly dispersing by stirring, ultrasonic irradiation and the like, a method of dissolving the microparticle in the solvent under a high temperature and causing crystallization, and the like are recited.

In the method (1) of dispersing the resin particle (B) in the carbon dioxide (C), it is preferred that the solution (L) of the resin (A) has an appropriate viscosity at the temperature in mixing with (C) for dispersing into (C), and it is preferably 100000 mPa·s or less, and more preferably 50000 mPa·s or less from the viewpoint of particle size distribution. The solubility of the resin (A) in (C) is preferably 3% or less, and more preferably 1% or less.

The SP value of the resin (A) is preferably 8 to 16, and more preferably 9 to 14. The SP value is represented by square root of a ratio of a cohesion energy density and a molecular volume as shown below.

$$SP = (\Delta E/V)^{1/2}$$

Here, $\Delta E$ represents a cohesion energy density. V represents a molecular volume, and the value is based on the calculation by Robert F. Fedors et al., and is described, for example, in Polymer engineering and science, vol. 14, pp. 147 to 154.

In the present invention, the resin particle (B) and the resin particle (X) containing the resin (A) may further contain other additives (pigments, fillers, antistatic agents, coloring agents, mold release agents, charge controllers, UV absorbers, antioxidants, blocking preventing agents, heat-resistant stabilizers, flame retardants, and the like). As a method of adding other additives to the resin particles (B) and (X), it is preferred to achieve dispersion by preliminarily mixing the resin (A) and the additives, and then adding the mixture to (C) to be dispersed.

As a result of adding a pigment or a coloring agent, and a mold release agent and/or a charge controller as necessary, to the resin particle, the electrophotographic toner of the present invention is realized.

In the method (1), the solution (L) of the resin (A) may be dispersed in the carbon oxide (C) by any method. As a specific example, a method of dispersing the solution (L) of the resin (A) by a stirrer, a disperser or the like, a method of forming a droplet by spraying the solution (L) of the resin (A) in the carbon oxide (C) via a spray nozzle, and bringing the resin in the droplet into a supersaturated state, thereby allowing precipitation of the resin particle (known as ASES: Aerosol Solvent Extraction System), a method of obtaining a particle by simultaneously blowing out the solution (L) together with a high-pressure gas, an entrainer and the like from separate tubes of coaxial multiple tubes (double tubes, triple tubes, and the like), thereby promoting division by application of external stress onto the droplet (known as SEDS: Solution Enhanced Dispersion by Supercritical Fluids), and a method of ultrasonic radiation are recited.

In this manner, the solution (L) of the resin (A) is dispersed in the carbon dioxide (C), and the microparticle (D) is adsorbed to the surface as is necessary, and thus a dispersion in which a resin particle (B') containing the resin (A) and the solvent (S) is dispersed in (C) is formed. When the microparticle (D) is used, the microparticle (D) is fixed on a surface of the resin particle (B'), or a film of (D) is formed.

The dispersion preferably has a single phase. In other words, it is not preferred that the phase of the solvent (S) is separated into a phase other than the phase containing the carbon dioxide (C) in which (B') is dispersed. Therefore, it is preferred to set the amount of the solution (L) of (A) relative to (C) so that the solvent phase will not separate. For example, the amount of the solution (L) is preferably 90% by weight or less, more preferably 5 to 80% by weight, and particularly preferably 10 to 70% by weight, relative to (C).

The amount of (S) contained in the resin particle (B') containing the resin (A) and the solvent (S) is preferably 10 to 90% by weight, and more preferably 20 to 70% by weight.

The weight ratio (A):(C) between the resin (A) and the carbon dioxide (C) is preferably 1:(0.1 to 100), more preferably 1:(0.5 to 50), and particularly preferably 1:(1 to 20).

The above method (2) is similar to the above method (1) except that the molten resin (A) is used in place of the solution (L) dissolving the resin (A) in the solvent (S), and a dispersion in which the resin particle (B) containing the resin (A) is dispersed in the carbon dioxide (C) is formed.

In the above methods (3) and (4), as a method of producing the resin particle (B) from the resin (A) in a liquid, massive, particulate, pellet or coarse powder form, the following methods can be recited.

(5) A method of dispersing the resin (A) liquefied in an aqueous medium, and taking it out.
(6) A method of crushing or grinding the resin (A) in a solid state.

The method (5) will be described.

Even in a solid state, the resin (A) can be liquefied by heating the resin (A) to the temperature equal to or higher than the melting point, or dissolving the resin (A) in an organic solvent.

As the organic solvent, the solvent (S) and the like may be used.

As the aqueous medium, any liquids containing water as an essential constitutional component can be used without any limitation, and water, an aqueous solution containing a surface activating agent, and the like may be used.

As the surface activating agent, known surface activating agents (for example, surface activating agents described in US Publication No. 2005-165139) and the like may be used.

As a dispersion apparatus used for emulsion dispersion, those generally used as emulsifiers or dispersers may be used without any particular limitation, and known dispersion apparatuses (for example, dispersion apparatuses described in US Publication No. 2003-125479) and the like may be used.

As a method of drawing the particulated resin particle (B) from the aqueous medium, a method of separating the resin particle (B) by a solid-liquid separation method (a centrifugal separator, a sparkler filter and/or a filter press, and the like) and then washing with water, and the like can be employed.

The obtainable resin particle (B) is dried as necessary. The drying is preferably conducted at a temperature lower than the melting point of the resin particle, and conducted under a reduced pressure as necessary. As a drier, known driers (for example, a fluid-bed drier, a reduced-pressure drier, and an air circulation drier) are used.

Next, the above method (6) will be described.

As a crusher that may be used for crushing or grinding, known crushers {for example, "Theory and Practice of Emulsion Dispersion" (manufactured by Tokusyu Kika Kogyo Co., Ltd., published on Apr. 17, 1997, pp. 80-86)} and the like may be used.

The resin particle (B) obtained in this manner may be classified by using an air classifier, a screen or the like as necessary, and the volume average particle size, and the ratio between the volume average particle size and the number average particle size may be adjusted.

In the above method (4), while the solvent (T) is not particularly limited as far as the resin particle (B) can be dispersed, include single solvents (for example, acetone, ethanol, dimethylformamide, isopropanol and the like), or mixed solvents [for example, two or more kinds of mixed solvents such as water, alcohol solvents (methanol, ethanol, and the like), amide solvents (dimethylformamide, and the like), ketone solvents (acetone, methylethylketone, and the like), ester solvents (ethyl acetate, butyl acetate, and the like), ether solvents (tetrahydrofuran, diethylether, and the like), aromatic hydrocarbon solvents (toluene, xylene, and the like), aliphatic hydrocarbon solvents (decane, hexane, heptane, and the like) and the like].

The weight ratio between the resin particle (B) and the solvent (T) is not particularly limited, and the resin particle (B) is preferably 55% by weight or less, more preferably 50% by weight or less, and particularly preferably 20 to 45% by weight, relative to the solvent (T). Within these ranges, the resin particle (B) can be introduced into (C) efficiently.

Here, the weight ratio between the carbon dioxide (C) and the solvent (T) is not particularly limited, and (T) is preferably 1 to 50% by weight, and more preferably 5 to 40% by weight, relative to the carbon dioxide (C). Within these ranges, the dispersibility of the resin particle (B) is improved.

In the methods (3) and (4), the weight ratio of the resin particle (B), relative to the weight of the carbon dioxide (C) is preferably 60% by weight or less, more preferably 55% by weight or less, and particularly preferably 20 to 50% by weight. Within these ranges, the resin particle (X) can be produced by an efficient treatment.

In the present invention, as the carbon dioxide (C) used for the treatment of the resin particle (B), liquid carbon dioxide and supercritical carbon dioxide can be used, and supercritical carbon dioxide is preferred.

Here, liquid carbon dioxide represents carbon dioxide in the temperature and pressure condition of the part surrounded by a gas-liquid boundary passing a triple point (temperature=$-57°$ C., pressure=0.5 MPa) of carbon dioxide and a critical point (temperature=$31°$ C., pressure=7.4 MPa) of carbon dioxide, an isothermal line of the critical temperature and a solid-liquid boundary on a phase chart represented by a temperature axis and a pressure axis of carbon dioxide. On the other hand, supercritical carbon dioxide represents carbon dioxide in the temperature and pressure condition equal or higher than the critical temperature. The pressure in the present invention represents the total pressure in the case of a mixed gas of two or more components.

The carbon dioxide (C) may appropriately contain an other substances (e), for example, inert gases such as nitrogen, helium, argon and air, for adjusting the physical property values as a dispersion medium (viscosity, diffusion coefficient, dielectric constant, solubility, interfacial tension, and the like).

The weight fraction of (C) in the total of (C) and the other substances (e) is preferably 70% or more, more preferably 80% or more, and particularly preferably 90% or more.

The treatment of the resin particle (B) in (C) is preferably conducted at the temperature as follows.

For preventing carbon dioxide from phase-transiting into a solid state in a piping under a reduced pressure to close the flow path, the temperature is preferably $30°$ C. or higher, and for preventing heat deterioration of the resin particle (B), the temperature is preferably $200°$ C. or less. It is more preferably 30 to $150°$ C., more preferably 34 to $130°$ C., particularly preferably 35 to $100°$ C., and most preferably $40°$ C. to $80°$ C.

The treatment is preferably conducted at the pressure as follows.

For satisfactorily dispersing the resin particle (B) into (C), the pressure is preferably 3 MPa or higher, and from the viewpoints of the installation cost and the operation cost, it is preferably 40 MPa or less. It is more preferably 3.5 to 35 MPa, more preferably 4 to 30 MPa, particularly preferably 4.5 to 25 MPa, and most preferably 5 to 20 MPa.

The temperature and the pressure in the treatment in the carbon dioxide (C) are preferably set in such a range that the resin particle (B) is not dissolved in (C) and the carbon dioxide (C) is able permeate in (B). Usually, (B) tends to hardly dissolve in (C) at a lower temperature and a lower pressure, and the carbon dioxide (C) tends to permeate into the resin particle (B) at a higher temperature and a higher pressure.

From a dispersion in which the resin particle (B) is dispersed, carbon dioxide (C) is removed usually by pressure reduction, to obtain the resin particle (X) of the present invention. At this time, the pressure reduction may be achieved stepwise by providing vessels with independently controlled pressures at multiple stages, or the pressure reduction may be conducted at once to normal temperature and normal pressure.

A method of collecting the resin particles (X) is not particularly limited, and a method of separating the particles by a filter, and a method of centrifuging the particles by a cyclone and the like are exemplified.

The resin particles (X) may be collected after pressure reduction, or pressure reduction may be effected after once collecting the particles under a high pressure prior to the pressure reduction. For drawing the resin particles (X) under a high pressure in the case of reducing the pressure after collecting the particles under a high pressure, the pressure of a collecting vessel may be reduced by a batch operation, or a continuous drawing operation maybe conducted using a rotary valve.

When a dispersion in which the resin particle (B') containing the resin (A) and the solvent (S) is dispersed in (C) is obtained by using the above method (1) of dispersing the resin particle (B) in the carbon dioxide (C), it is necessary to remove or reduce the solvent (S) after formation and treatment of the resin particle (B').

As a method of removing or reducing the solvent (S), a method of directly reducing the pressure of a vessel is known, however, such problems may arise that the solvent dissolved in (B') condenses and redissolve the resin particle (B'), and that the resin particles (X) unite one another during collection of the resin particles (X).

As a preferred method, for example, a method of mixing a dispersion in which the resin particle (B') is dispersed in (C) with further carbon dioxide (C) to extract the solvent (S) into the phase of carbon dioxide from the resin particle (B'), then replacing carbon dioxide containing the solvent (S) with the carbon dioxide (C) not containing the solvent (S), and then reducing the pressure, and the like are recited.

As a method of mixing carbon dioxide, carbon dioxide with a pressure higher than that of the dispersion may be applied, or the dispersion may be added to carbon dioxide with a pressure lower than that of the dispersion, however, the latter is preferred from the viewpoint of easiness of continuous operation. The amount of carbon dioxide to be mixed with the dispersion is preferably 1 to 50 times, more preferably 1 to 40 times, and most preferably 1 to 30 times the volume of the dispersion from the viewpoint of preventing uniting of the resin particles (B'). It is possible to prevent the resin particles (B') from uniting one another by removing or reducing the solvent contained in resin particle (B') and then removing carbon dioxide as described above.

As a method of replacing carbon dioxide containing the solvent (S) with carbon dioxide not containing the solvent (S), a method of allowing carbon dioxide to flow until the solvent (S) is completely removed while keeping the pressure after temporarily capturing the resin particle (B') with a filter or a cyclone is recited. The amount of carbon dioxide that is allowed to flow is preferably 1 to 100 times, more preferably 1 to 70 times, and most preferably 1 to 50 times the volume of the dispersion from the viewpoint of removing the solvent from the dispersion.

The resin particle (X) of the present invention obtained by the above production method has improved the degree of crystallization and increased heat of fusion of the melting point as a result of the treatment with liquid or supercritical carbon dioxide (C).

The volume average particle size of the resin particle (X) of the present invention obtained by the production method of the present invention is preferably 1 to 12 µm, more preferably 2 to 10 µm, and more preferably 3 to 8 µm. When it is 1 µm or more, a handling property as a powder is improved. When it is 12 µm or less, the melting property is improved.

A ratio Dv/Dn between the volume average particle size Dv of the resin particle (X) and the number average particle size Dn of the resin particle (X) is preferably 1.0 to 1.5, more preferably 1.0 to 1.4, and more preferably 1.0 to 1.3. When it is 1.5 or less, the handling property and melting property as a powder are significantly improved.

The volume average particle size Dv of the resin particle (X), and the ratio Dv/Dn between the volume average particle size Dv and the number average particle size Dn of the resin particle (X) are adjusted in the production step of the resin particle (B) for the method (3) or (4) in which the resin particle (B) is dispersed in (C). In the case of the method (1), they can be adjusted by the stirring rate, and the ratio of the microparticle (D) to the resin (A) in dispersing the resin (A) dissolved in the solvent (S), and the microparticle (D) as necessary in (C). The volume average particle size decreases as the stirring rate increases, and the volume average particle size decreases as the ratio of the microparticle (D) to the resin (A) increases.

The same also applies to the Dv/Dn of the resin particle (X), and the Dv/Dn decreases as the stirring rate increases, and the Dv/Dn decreases as the ratio of the microparticle (D) to the resin (A) increases.

The resin particle (X) obtained in this manner may be classified by using an air classifier, a screen or the like as necessary, and the volume average particle size, and the ratio between the volume average particle size and the number average particle size may be further adjusted.

The volume average particle size and the number average particle size can be measured by a laser particle size distribution measuring device, LA-920 (manufactured by HORIBA, Ltd.), Multisizer III (manufactured by COULTER), ELS-800 using Laser Doppler method as an optical system (manufactured by OTSUKA ELECTRONICS CO. LTD.) and the like.

The electrophotographic toner of the present invention is preferably added with an external additive.

As the electrophotographic toner, for imparting flow characteristics, resin particles for toner are usually mixed with an inorganic powder or the like of various metal oxides or the like before use, and such an inorganic powder or the like is called an external additive.

As the external additive, for example, silicon dioxide (silica), titanium dioxide (titania), aluminum oxide, zinc oxide, magnesium oxide, cerium oxide, iron oxide, copper oxide, tin oxide, and the like are known. A silica microparticle that is hydrophobized by reacting a silica or titanium oxide microparticle with an organic silicon compound such as dimethyldichlorosilane, hexamethyldisilazane, or silicone oil and replacing a silanol group on a surface of the silica microparticle with an organic group is preferably used.

From the viewpoint of realizing both a fixing property and fluidity, although not particularly limited, the amount of the external additive used (% by weight) is preferably 0.01 to 5, more preferably 0.1 to 4, and particularly preferably 0.5 to 3, relative to the weight of the electrophotographic toner to which the external additive is not added.

EXAMPLES

In the following, the present invention will be further described by way of examples, however, the present invention is not limited to these examples. In the following description, "part(s)" represents part(s) by weight, and "%" represents % by weight.

Example of First Invention

Production Example 1

In a reaction vessel equipped with a stirrer and a dehydrator, 475 parts of dodecane dicarboxylic acid, 230 parts of 1,6-hexanediol, and 2 part of dibutyl tin oxide were charged, and allowed for a dehydration reaction at a normal pressure at 230° C. for 5 hours, and then allowed for a dehydration reaction at a reduced pressure of 0.5 kPa for 5 hours. Further, the reaction was cooled to 180° C., to obtain a polyester resin [crystalline part (a-1)] not containing an aromatic ring. The [crystalline part (a-1)] had an Mw of 10000, a melting point (m) of 70° C., and a hydroxyl group value of 27.

Production Example 2

A polyester resin [crystalline part (a-2)] not containing an aromatic ring was obtained in a similar manner to Production Example 1 except that 220 parts of 1,4-butanediol, 460 parts of sebacic acid, and 1 part of dibutyl tin oxide as a condensation catalyst were used. The [crystalline part (a-2)] had an Mw of 9900, a melting point (m) of 60° C., and a hydroxyl group value of 31.

Production Example 3

A polyester resin [crystalline part (a-3)] not containing an aromatic ring was obtained in a similar manner to Production Example 1 except that 200 parts of 1,6-hexanediol, 40 parts of diethyleneglycol, 420 parts of dodecane dicarboxylic acid, and 1 part of dibutyl tin oxide as a condensation catalyst were used. The [crystalline part (a-3)] had an Mw of 6500, a melting point (m) of 49° C., and a hydroxyl group value of 29.

Production Example 4

A polyester resin [crystalline part (a-4)] not containing an aromatic ring was obtained in a similar manner to Production Example 1 except that except that 250 parts of 1,6-hexanediol, 70 parts of 1,4-cyclohexanedimethanol, 350 parts of adipic acid, and 1 part of dibutyl tin oxide as a condensation catalyst were used. The [crystalline part (a-4)] had an Mw of 8800, a melting point (m) of 53° C., and a hydroxyl group value of 28.

Production Example 5

In a reaction vessel equipped with a stirrer and a solvent remover, 1000 parts of methylethylketone, 19 parts of 1,4-butanediol, 54 parts of hexamethylene diisocyanate were charged, and allowed to react at 80° C. for 7 hours, to obtain a polyurethane resin. Then, 427 parts of a polyester diol (Product name "HS 2H-200S" manufactured by HOKOKU CORPORATION) composed of 1,6-hexanediol having a hydroxyl group value of 56 and sebacic acid was charged, and allowed to react at 80° C. for 7 hours, and the solvent was removed at 80° C., at 20 kPa, to obtain a composite resin [crystalline part (a-5)] composed of a polyester resin not containing an aromatic ring and a polyurethane resin. The [crystalline part (a-5)] had an Mw of 10500, a melting point (m) of 72° C., and a hydroxyl group value of 23.

Production Example 6

A polyester resin [noncrystalline part (b-1)] was obtained in a similar manner to Production Example 1 except that 200 parts of PO 3 mol adduct of bisphenol A, 46 parts of isophthalic acid, and 2 parts of dibutyl tin oxide were used. The [noncrystalline part (b-1)] had an Mw of 5000.

Production Example 7

In a reaction vessel equipped with a stirrer and a dehydrator, 500 parts of tetrahydrofuran, 360 parts of 1,2-propyleneglycol, 640 parts of toluene diisocyanate were charged, and allowed to react at 80° C. for 5 hours, and the solvent was removed at 80° C., at 20 kPa, to obtain a polyurethane resin [noncrystalline part (b-2)]. The [noncrystalline part (b-2)] had an Mw of 3000.

Production Example 8

A polyurethane resin [noncrystalline part (b-3)] was obtained in a similar manner to Production Example 7 except that 500 parts of methylethylketone, 210 parts of 1,4-cyclohexanedimethanol, and 290 parts of toluene diisocyanate were used. The [noncrystalline part (b-3)] had an Mw of 5000.

Production Example 9

In a reaction vessel equipped with a stirrer and a dehydrator, 500 parts of tetrahydrofuran, 200 parts of the [noncrystalline part (b-1)], and 35 parts of toluene diisocyanate were charged, and allowed to react at 80° C. for 5 hours, and then 800 parts of the [crystalline part (a-1)] was charged, and allowed to react at 80° C. for 5 hours, and the solvent was removed at 80° C., at 20 kPa, to obtain a resin (A-1). (A-1) had an Mw of 26000, a softening point (s) of 65° C., a melting point (m) of 60° C., and a ratio of the softening point (s) and the melting point (m) (s/m) of 1.08.

A G'(m+20) was $6 \times 10^2$ Pa, a melting starting temperature (x) was 50° C., and a value of |Log G"(x+20)−Log G"(x)| was 3.4.

A ratio [G"(m+30)/G"(m+70)] between a loss elastic modulus G"(m+30) at (m+30)° C. and a loss elastic modulus G"(m+70) at (m+70)° C. was 1.4.

In the formula of the coupling form between (b) and (a), n was equal to 1.25. The above physical property values were described in Table 1.

In a reaction vessel equipped with a stirrer, 300 parts of the resin (A-1), 630 parts of acetone, 70 parts of ion exchange water were added, and allowed to dissolve, to obtain a resin solution (L-1).

Production Example 10

In a reaction vessel equipped with a stirrer and a dehydrator, 500 parts of tetrahydrofuran, 200 parts of the [noncrystalline part (b-2)], and 74 parts of toluene diisocyanate were charged, and allowed to react at 80° C. for 5 hours, and then 1000 parts of the [crystalline part (a-1)] was charged, and allowed to react at 80° C. for 5 hours, and the solvent was removed at 80° C., at 20 kPa, to obtain a resin (A-2). The physical property values of the resin (A-2) were described in Table 1.

In a reaction vessel equipped with a stirrer, 300 parts of the resin (A-2), 630 parts of acetone, and 70 parts of ion exchange water were added, and allowed to dissolve, to obtain a resin solution (L-2).

Production Example 11

In a reaction vessel equipped with a stirrer and a dehydrator, 500 parts of tetrahydrofuran, 200 parts of the [noncrystalline part (b-1)], and 35 parts of toluene diisocyanate were charged, and allowed to react at 80° C. for 5 hours, and then 800 parts of the [crystalline part (a-2)] was charged, and allowed to react at 80° C. for 5 hours, and the solvent was removed at 80° C., at 20 kPa, to obtain a resin (A-3). The physical property values of the resin (A-3) were described in Table 1.

In a reaction vessel equipped with a stirrer, 300 parts of the resin (A-3), 630 parts of acetone, and 70 parts of ion exchange water were added, and allowed to dissolve, to obtain a resin solution (L-3).

Production Example 12

In a reaction vessel equipped with a stirrer and a dehydrator, 500 parts of methylethylketone, 200 parts of the [noncrystalline part (b-1)], and 33 parts of hexamethylene diisocyanate were charged, and allowed to react at 80° C. for 5 hours, and then 650 parts of the [crystalline part (a-3)] was charged, and allowed to react at 80° C. for 5 hours, and the solvent was removed at 90° C., at 20 kPa, to obtain a resin (A-4). The physical property values of the resin (A-4) were described in Table 1.

In a reaction vessel equipped with a stirrer, 300 parts of the resin (A-4), 630 parts of acetone, and 70 parts of ion exchange water were added, and allowed to dissolve, to obtain a resin solution (L-4).

Production Example 13

In a reaction vessel equipped with a stirrer and a dehydrator, 500 parts of tetrahydrofuran, 180 parts of the [noncrystalline part (b-3)], and 1000 parts of the [crystalline part (a-1)] were charged, and allowed to react at 80° C. for 5 hours, and the solvent was removed at 80° C., at 20 kPa, to obtain a resin (A-5). The physical property values of the resin (A-5) were described in Table 1.

In a reaction vessel equipped with a stirrer, 300 parts of the resin (A-5), 630 parts of acetone, and 70 parts of ion exchange water were added, and allowed to dissolve, to obtain a resin solution (L-5).

Production Example 14

In a reaction vessel equipped with a stirrer and a dehydrator, 500 parts of tetrahydrofuran, 180 parts of the [noncrystalline part (b-3)], and 700 parts of the [crystalline part (a-4)] were charged, and allowed to react at 80° C. for 5 hours, and the solvent was removed at 80° C., at 20 kPa, to obtain a resin (A-6). The physical property values of the resin (A-6) were described in Table 1.

In a reaction vessel equipped with a stirrer, 300 parts of the resin (A-6), 630 parts of acetone, and 70 parts of ion exchange water were added, and allowed to dissolve, to obtain a resin solution (L-6).

Production Example 15

In a reaction vessel equipped with a stirrer and a dehydrator, 500 parts of tetrahydrofuran, 180 parts of the [noncrystalline part (b-3)], and 570 parts of the [crystalline part (a-5)] were charged, and allowed to react at 80° C. for 5 hours, and the solvent was removed at 80° C., at 20 kPa, to obtain a resin (A-7). The physical property values of the resin (A-7) were described in Table 1.

In a reaction vessel equipped with a stirrer, 300 parts of the resin (A-7), 630 parts of acetone, and 70 parts of ion exchange water were added, and allowed to dissolve, to obtain a resin solution (L-7).

TABLE 1

|  | Production Example 9 | Production Example 10 | Production Example 11 | Production Example 12 | Production Example 13 | Production Example 14 | Production Example 15 |
| --- | --- | --- | --- | --- | --- | --- | --- |
| Resin | A-1 | A-2 | A-3 | A-4 | A-5 | A-6 | A-7 |
| Mw | 26000 | 20000 | 24000 | 23000 | 26000 | 22000 | 42000 |
| Softening point (s) (° C.) | 65 | 76 | 52 | 79 | 76 | 55 | 74 |
| Melting point (m) (° C.) | 60 | 70 | 54 | 81 | 74 | 52 | 70 |
| (s/m) | 1.08 | 1.09 | 0.96 | 0.98 | 1.03 | 1.06 | 1.06 |
| G' (m + 20) (Pa) | $6 \times 10^2$ | $3 \times 10^3$ | $2 \times 10^2$ | $1 \times 10^5$ | $8 \times 10^4$ | $3 \times 10^2$ | $8 \times 10^3$ |
| Melting starting temperature (x) (° C.) | 50 | 65 | 60 | 75 | 68 | 58 | 66 |
| \|LogG" (x + 20) − LogG" (x)\| | 3.4 | 2.9 | 3.1 | 2.6 | 3.7 | 2.2 | 3.0 |
| G" (m + 30)/G" (m + 70) | 1.4 | 1.2 | 0.3 | 3.6 | 7.1 | 0.6 | 1.8 |
| n in formula of coupling form between (b) and (a) | 1.25 | 1.09 | 0.94 | 1.43 | 1.07 | 0.96 | 2.03 |

<Preparation of Microparticle Dispersion Liquid for Dispersion>

Production Example 16

In a reaction vessel equipped with a stirrer, a heating and cooling device, a thermometer, a dropping funnel, and a nitrogen blowing tube, 500 parts of toluene was charged. In a different glass beaker, 350 parts of toluene, 150 parts of behenyl acrylate (acrylate of alcohol having a straight-chain alkyl group with 22 carbon atoms: BLEMMER VA (manufactured by NOF CORPORATION)), and 7.5 parts of azobisisobutylonitrile (AIBN) were charged, stirred and mixed at 20° C. to prepare a monomer solution, which was then charged in a dropping funnel. After replacing a gas phase part of the reaction vessel with nitrogen, the monomer solution was added dropwise at 80° C. over 2 hours in a hermetically sealed condition, and aged at 85° C. for 2 hours from the completion of the dropping, and then the toluene was removed at 130° C. for 3 hours under a reduced pressure, to obtain an acrylic crystalline resin. This resin had a melting point of 65° C., and a number average molecular weight of 50,000.

After mixing 700 parts of n-hexane and 300 parts of the acrylic crystalline resin, grinding was conducted using zirconia beads having a particle size of 0.3 mm by means of a beads mill (DYNO-MILL MULTI-LAB: manufactured by Shinmaru Enterprises Corporation), to obtain a milky white hexane dispersion liquid in which a microparticle (D-1) for dispersion is dispersed. The volume average particle size of the dispersion liquid was 0.3 µm.

Production Example 17

A water dispersion liquid of a microparticle (D'-1) for dispersion for comparable example was obtained in a similar manner except that 700 parts of hexane was changed to 700 parts of ion exchange water in the preparation of the microparticle (D-1) dispersion of the acrylic crystalline resin of Production Example 16. The volume average particle size of the water dispersion liquid was 0.3 µm.

Example 1

In an experiment device of FIG. 1, first, valves V1, V2 were closed, and carbon dioxide (purity 99.99%) was introduced into a particle collecting vessel T4 from a cylinder B2 using a pump P4 to adjust the pressure and the temperature to 14 MPa and 40° C. Further, a resin solution tank T1 was charged with the resin solution (L-1) obtained in Production Example 9, and a microparticle dispersion liquid tank T2 was charged with the hexane dispersion liquid of the microparticle (D-1) for dispersion.

Next, from a cylinder B1 of liquid carbon dioxide, liquid carbon dioxide was introduced in a dispersion vessel T3 by using a pump P3 and adjusted to a supercritical state (9 MPa, 40° C.), and also the hexane dispersion liquid of the microparticle (D-1) was introduced from the tank T2 using a pump P2.

Next, the resin solution (L-1) was introduced into the dispersion vessel T3 from the tank T1 using the pump P1 while inside the dispersion vessel T3 was stirred at 2000 rpm. The internal pressure of the T3 after introduction was 14 MPa.

The weight ratio of the composition charged into the dispersion vessel T3 is as follows.

| | |
|---|---|
| Resin solution (L-1) | 270 parts |
| Hexane dispersion liquid of microparticle (D-1) for dispersion | 45 parts |
| Carbon dioxide | 550 parts |

The weight of the introduced carbon dioxide was determined by calculating the density of carbon dioxide by the condition formula described in the following document from the temperature (40° C.) and the pressure (15 MPa) of carbon dioxide, and multiplying this by the volume of the dispersion vessel T3 (the same applies hereinafter).

Document: Journal of Physical and Chemical Reference data, vol. 25, P. 1509 to 1596

After introducing the resin solution (L-1), stirring was conducted for 1 minute, to obtain a dispersion in which the resin particle (B-1) was dispersed in supercritical carbon dioxide.

Next, the dispersion of (B-1) was transferred from T3 to T4 by opening the valve V1 and introducing supercritical carbon dioxide from B1 into T3 and T4 using P3. The degree of opening of V2 was adjusted so that the pressure was kept constant during transferring of the dispersion of (B-1) from T3 to T4. This operation was conducted for 30 seconds, and V1 was closed.

Then, carbon dioxide was introduced into the particle collecting vessel T4 from the pressure cylinder B2 using the pump P4 while the pressure was kept at 14 MPa by adjusting the degree of opening of the pressure adjustment valve V2.

By this operation, carbon dioxide containing the solvent was discharged into a solvent trap vessel T5 and the resin particle (B-1) was captured in a filter F1. The operation of introducing carbon dioxide from the pressure cylinder B2 into the particle collecting vessel T4 using the pump P4 was stopped when an amount 5 times the weight of carbon dioxide introduced into the above dispersion vessel T3 was introduced into the particle collecting vessel T4. At the time of this stopping, the operation of replacing carbon dioxide containing a solvent with carbon dioxide not containing a solvent and capturing the resin particle (B-1) in the filter F1 was completed. Further, the pressure adjustment valve V2 was opened little by little, and the internal pressure of the particle collecting vessel was reduced to an atmosphere pressure, and the resin particle (X-1) of the first invention captured in the filter F1 was obtained.

Examples 2 to 7

Resin particles (X-2) to (X-7) of the present invention were obtained in a similar manner to Example 1 except that the resin solution (L-1) was changed to the resin solutions (L-2) to (L-7) obtained in Production Examples 10 to 15.

Examples 8 to 14

Electrophotographic toners (X'-1) to (X'-7) of the present invention were obtained in similar manners to Examples 1 to 7 except that coloring resin solutions prepared by mixing each 270 parts of (L-1) to (L-7) with 5 parts of a carbon black processed pigment ("MICROLITH Black C-K" manufactured by Ciba Japan) as a coloring agent were used in place of the resin solutions (L-1) to (L-7).

Comparative Example 1

To a beaker, 97 parts of ion exchange water, 15.4 parts of a water dispersion liquid of the microparticle (D'-1) for dispersion obtained in Production Example 17, 1 part of sodium carboxymethyl cellulose, and 10 parts of a 48.5% aqueous solution of sodium dodecyldiphenylether disulfonate (Eleminol MON-7, manufactured by Sanyo Chemical Industries, Ltd.) were added and dissolved uniformly. Then, 75 parts of the resin solution (L-1) obtained in Production Example 9 was charged under stirring with a TK-type homomixer at 10,000 rpm at 25° C. and stirred for 2 minutes. Then, this mixed liquid was transferred to a recovery flask equipped with a stirring rod and a thermometer, and acetone was distilled away until the concentration was 0.5% or less with elevating the temperature to 35° C., to obtain an aqueous resin dispersion of the resin particle.

Then filtration was executed, and the resultant was dried at 40° C. for 18 hours, to obtain a resin particle (R-1) for comparison with a volatile content of 0.5% or less. Thereafter, the treatment by supercritical carbon dioxide was not conducted, and the physical properties were evaluated.

Comparative Example 2

To a beaker, 97 parts of ion exchange water, 1 part of sodium carboxymethyl cellulose, and 15 parts of a 48.5% aqueous solution of sodium dodecyldiphenylether disulfonate (Eleminol MON-7, manufactured by Sanyo Chemical Industries, Ltd.) were added and dissolved uniformly.

Then, 75 parts of the resin solution (L-1) obtained in Production Example 9 was charged under stirring with a TK-type homomixer at 12,000 rpm at 25° C. and stirred for 2 minutes. Then, this mixed liquid was transferred to a recovery flask equipped with a stirring rod and a thermometer, and acetone was distilled away until the concentration was 0.5% or less with elevating the temperature to 35° C., to obtain an aqueous resin dispersion of the resin particle.

Then filtration was executed, and the resultant was dried at 40° C. for 18 hours, to obtain a resin particle (R-2) for comparison with a volatile content of 0.5% or less. Thereafter, the treatment by supercritical carbon dioxide was not conducted, and the physical properties were evaluated.

Comparative Examples 3 and 4

Electrophotographic toners for comparison (R'-1) and (R'-2) were obtained in similar manners to Comparative Examples 1 and 2 except that a coloring resin solution prepared by mixing 75 parts of (L-1) with 1.4 parts of a carbon black processed pigment ("MICROLITH Black C-K" manufactured by Ciba Japan) as a coloring agent was used in place of the resin solution (L-1).

<Method of Measuring Melting Point (m) and Heat of Fusion>

A sample (5 mg) was collected and put into an aluminum pan, and a temperature of an endothermic peak due to melting was determined at a temperature elevating rate of 10° C. per minute by means of a DSC (measuring device: RDC220, manufactured by SII NanoTechnology Inc.), and the temperature was determined as a melting point (m).

A heat of fusion was determined from an area of an endothermic peak. Using the determined heat of fusion, a ratio of heat of fusion was determined from the following calculative formula.

Ratio of heat of fusion=$H2/H1$

<Evaluation of Volume Average Particle Size>

Resin particles were dispersed in an aqueous sodium dodecylbenzene sulfonate solution (concentration 0.1%) and the volume average particle size was measured by a Coulter counter [Multisizer III (manufactured by Beckman Coulter, Inc.)].

<Evaluation of Heat Resistant Keeping Property>

The heat resistant keeping property of the resin particle was evaluated in the following manner.

10 g of the resin particles were collected in a 30 mL glass screw tube having a diameter of about 3 cm. The glass screw tube containing the resin particles was left still in a thermostat set at 50° C. for 15 hours, and evaluation was made according to the following criteria from the degree of blocking.

good: blocking did not occur acceptable: blocking occurred, but easily dispersed by simply applying force with a finger or the like poor: blocking occurred, and did not easily disperse by simply applying force with a finger or the like <Evaluation of Low Temperature Fixing Property>

The fixing temperature was evaluated by the following method.

The electrophotographic toner of the present invention or an electrophotographic toner for comparison was added with 1.0% of AEROSIL R972 (manufactured by Nippon Aerosil Co., Ltd.), and mixed well by using a mixer to produce a toner for evaluation in which AEROSIL R972 is uniformly adhered to the surface of the toner.

The toner for evaluation obtained as described above was placed uniformly on a paper surface so that a density of 0.6 mg/cm$^2$ was achieved.

At this time, the method of placing the powder onto the paper surface used a printer from which a heat fixing machine is removed (other methods may be used as far as the powder can be placed uniformly at the above weight density). The temperature at which cold offset occurred when the resultant paper was caused to pass through a compression roller at a fixing rate (compression roller circumferential rate) of 213 mm/sec and a fixing pressure (compression roller pressure) of 10 kg/cm$^2$ was measured.

The fixing temperatures of the electrophotographic toners (X'-1) to (X'-7) of the present invention produced in Examples 8 to 14, and the electrophotographic toners (R'-1) and (R'-2) for comparison produced in Comparative Examples 3 and 4, and heat resistant keeping properties of the resin particles (X-1) to (X-7) of the present invention produced in Examples 1 to 7 and the resin particles (R-1) and (R-2) for comparison produced in Comparison Examples 1 and 2 were measured in the methods as described above. The results are shown in Table 2.

TABLE 2

|  | Example 1 | Example 2 | Example 3 | Example 4 | Example 5 | Example 6 | Example 7 | Comparative Example 1 | Comparative Example 2 |
|---|---|---|---|---|---|---|---|---|---|
| Resin particle | (X-1) | (X-2) | (X-3) | (X-4) | (X-5) | (X-6) | (X-7) | (R-1) | (R-2) |
| Resin | (A-1) | (A-2) | (A-3) | (A-4) | (A-5) | (A-6) | (A-7) | (A-1) | (A-1) |
| <Composition> | | | | | | | | | |
| Crystalline part | (a-1) | (a-1) | (a-2) | (a-3) | (a-1) | (a-4) | (a-5) | (a-1) | (a-1) |
| Noncrystalline part | (b-1) | (b-2) | (b-1) | (b-1) | (b-3) | (b-3) | (b-3) | (b-1) | (b-1) |
| Microparticle for dispersion | (D-1) | (D-1) | (D-1) | (D-1) | (D-1) | (D-1) | (D-1) | (D'-1) | without use |
| <Evaluation of physical property and performance> | | | | | | | | | |
| Heat of fusion H1 (J/g) | 26 | 26 | 22 | 27 | 25 | 24 | 23 | 18 | 18 |
| Heat of fusion H2 (J/g) | 17 | 17 | 6 | 23 | 13 | 14 | 16 | 18 | 18 |

TABLE 2-continued

| | | | | | | | | | |
|---|---|---|---|---|---|---|---|---|---|
| H2/H1 | 0.65 | 0.65 | 0.27 | 0.85 | 0.52 | 0.58 | 0.70 | 1.00 | 1.00 |
| Volume average particle size (μm) | 5 | 5 | 6 | 4 | 5 | 5 | 5 | 5 | 5 |
| Melting point (° C.) | 60 | 70 | 54 | 81 | 74 | 52 | 70 | 50 | 50 |
| Heat resistant keeping property | Good | Good | Good | Good | Good | Good | Good | Acceptable | Poor |

| | Example 8 | Example 9 | Example 10 | Example 11 | Example 12 | Example 13 | Example 14 | Comparative Example 3 | Comparative Example 4 |
|---|---|---|---|---|---|---|---|---|---|
| Electrophotographic toner <Evaluation of physical property and performance> | (X'-1) | (X'-2) | (X'-3) | (X'-4) | (X'-5) | (X'-6) | (X'-7) | (R'-1) | (R'-2) |
| Fixing temperature (° C.) | 110 | 110 | 115 | 115 | 110 | 110 | 110 | 130 | 115 |

The resin particles and the electrophotographic toners of Examples 1 to 14 were excellent in the heat resistant keeping property and the low temperature fixing property, while the resin particles and the electrophotographic toners of Comparative Examples 1 and 3 exhibited significantly impaired low temperature fixing property. The resin particles and the electrophotographic toners of Comparative Examples 2 and 4 were excellent in the low temperature fixing property, but exhibited significantly impaired heat resistant keeping property.

Example of Second Invention

Production Example 21

In a reaction vessel equipped with a stirrer and a dehydrator, 420 parts of terephthalic acid, 180 parts of isophthalic acid, 400 parts of 1,5-pentanediol, 2 parts of dibutyl tin oxide were charged, and allowed for a dehydration reaction at a normal pressure, at 230° C. for 5 hours, and then allowed for a hydration reaction at a reduced pressure of 0.5 kPa for 5 hours. Further, the reaction was cooled to 180° C., to obtain a polyester resin [crystalline part (a-21)] containing an aromatic ring. The [crystalline part (a-21)] had an Mw of 9000, a melting point (m) of 85° C., and a hydroxyl group value of 28.

Production Example 22

An polyester resin [crystalline part (a-22)] containing an aromatic ring was obtained in a similar manner to Production Example 21 except that 100 parts of terephthalic acid, 440 parts of adipic acid, 460 parts of 1,6-hexanediol, and 2 parts of dibutyl tin oxide as a condensation catalyst were used. The [crystalline part (a-22)] had an Mw of 7000, a melting point (m) of 62° C., and a hydroxyl group value of 35.

Production Example 23

An polyester resin [crystalline part (a-23)] containing an aromatic ring was obtained in a similar manner to Production Example 21 except that 240 parts of 1,6-hexanediol, 220 parts of bisphenol A•EO 2 mol adduct, 540 parts of dodecane dicarboxylic acid, and 1 part of dibutyl tin oxide as a condensation catalyst were used. The [crystalline part (a-23)] had an Mw of 6500, a melting point (m) of 49° C., and a hydroxyl group value of 37.

Production Example 24

In a reaction vessel equipped with a stirrer and a solvent remover, 1000 parts of methylethylketone, 13 parts of 1,4-butanediol, and 38 parts of hexamethylene diisocyanate were charged, and allowed to react at 80° C. for 7 hours, to obtain a polyurethane resin, and then 449 parts of the [crystalline part (a-22)] was added, and allowed to react at 80° C. for 7 hours, and the solvent was removed at 80° C., at 20 kPa, to obtain a composite resin [crystalline part (a-24)] composed of a polyester resin containing an aromatic ring and a polyurethane resin. The [crystalline part (a-24)] had an Mw of 14200, a melting point (m) of 68° C., and a hydroxyl group value of 18.

Production Example 25

In a reaction vessel equipped with a stirrer and a dehydrator, 500 parts of tetrahydrofuran, 360 parts of 1,2-propyleneglycol, and 640 parts of toluene diisocyanate were charged, and allowed to react at 80° C. for 5 hours, and the solvent was removed at 80° C., at 20 kPa, to obtain a polyurethane resin [noncrystalline part (b-21)]. The [noncrystalline part (b-21)] had an Mw of 3000.

Production Example 26

A polyurethane resin [noncrystalline part (b-22)] was obtained in a similar manner to Production Example 25 except that 500 parts of methylethylketone, 210 parts of 1,4-cyclohexanedimethanol, and 290 parts of toluene diisocyanate were used. The [noncrystalline part (b-22)] had an Mw of 5000.

Production Example 27

In a reaction vessel equipped with a stirrer and a dehydrator, 500 parts of tetrahydrofuran, 600 parts of the [noncrystalline part (b-21)], 70 parts of toluene diisocyanate were charged, and allowed to react at 80° C. for 5 hours, and then 800 parts of the [crystalline part (a-21)] was charged, and allowed to react at 80° C. for 5 hours, and the solvent was removed at 80° C., at 20 kPa, to obtain a resin (A-21). (A-21) had an Mw of 20000, a softening point of 63° C., a melting point (m) of 60° C., and a ratio (s/m) between the softening point (s) and the melting point (m) of 1.05.

A G'(m+20) was $8 \times 10^3$ Pa, a melting starting temperature (x) was 68° C., and a value of |Log G"(x+20)−Log G"(x)| was 3.5.

A ratio [G"(m+30)/G"(m+70)] between a loss elastic modulus G"(m+30) at (m+30)° C. and a loss elastic modulus G"(m+70) at (m+70)° C. was 2.9.

In the formula of the coupling form between (b) and (a), n was equal to 1.09. The physical property values of the resin (A-21) were described in Table 3.

In a reaction vessel equipped with a stirrer, 300 parts of this resin (A-21), 630 parts of acetone, and 70 parts of ion exchange water were added, and allowed to dissolve, to obtain a resin solution (L-21).

Production Example 28

In a reaction vessel equipped with a stirrer and a dehydrator, 500 parts of tetrahydrofuran, 180 parts of the [noncrystalline part (b-21)], and 20 parts of toluene diisocyanate were charged, and allowed to react at 80° C. for 5 hours, and then 840 parts of the [crystalline part (a-22)] was charged and allowed to react at 80° C. for 5 hours, and the solvent was removed at 80° C., 20 kPa, to obtain a resin (A-22). The physical property values of the resin (A-22) were described in Table 3.

Production Example 31

In a reaction vessel equipped with a stirrer and a dehydrator, 600 parts of methylethylketone, 120 parts of the [noncrystalline part (b-22)], and 500 parts of the [crystalline part (a-24)] were charged, and allowed to react at 80° C. for 5 hours, and the solvent was removed at 80° C., at 20 kPa, to obtain a resin (A-25). The physical property values of the resin (A-25) were described in Table 3.

In a reaction vessel equipped with a stirrer, 300 parts of this resin (A-25), 630 parts of acetone, and 70 parts of ion exchange water were added, and allowed to dissolve, to obtain a resin solution (L-25).

TABLE 3

|  | Production Example 27 | Production Example 28 | Production Example 29 | Production Example 30 | Production Example 31 |
|---|---|---|---|---|---|
| Resin | A-21 | A-22 | A-23 | A-24 | A-25 |
| Mw | 20000 | 21000 | 17000 | 25000 | 49000 |
| Softening point (s) (° C.) | 63 | 58 | 55 | 74 | 69 |
| Melting point (m) (° C.) | 60 | 59 | 53 | 81 | 72 |
| (s/m) | 1.05 | 0.98 | 1.04 | 0.91 | 0.96 |
| G' (m + 20) (Pa) | $8 \times 10^3$ | $4 \times 10^4$ | $7 \times 10^2$ | $1 \times 10^5$ | $8 \times 10^4$ |
| Melting starting temperature (x) (° C.) | 68 | 52 | 51 | 74 | 67 |
| \|LogG" (x + 20) − LogG" (x)\| | 3.5 | 2.9 | 2.6 | 3.1 | 2.2 |
| G" (m + 30)/G" (m + 70) | 2.9 | 0.3 | 6.8 | 1.8 | 3.1 |
| n in formula of coupling form between (b) and (a) | 1.09 | 1.40 | 1.11 | 1.14 | 1.81 |

In a reaction vessel equipped with a stirrer, 300 parts of this resin (A-22), 630 parts of acetone, and 70 parts of ion exchange water were added, and allowed to dissolve, to obtain a resin solution (L-22).

Production Example 29

In a reaction vessel equipped with a stirrer and a dehydrator, 500 parts of tetrahydrofuran, 180 parts of the [noncrystalline part (b-21)], and 20 parts of toluene diisocyanate were charged, and allowed to react at 80° C. for 5 hours, and then 820 parts of the [crystalline part (a-23)] was charged and allowed to react at 80° C. for 5 hours, and the solvent was removed at 80° C., 20 kPa, to obtain a resin (A-23). The physical property values of the resin (A-23) were described in Table 3.

In a reaction vessel equipped with a stirrer, 300 parts of this resin (A-23), 630 parts of acetone, and 70 parts of ion exchange water were added, and allowed to dissolve, to obtain a resin solution (L-23).

Production Example 30

In a reaction vessel equipped with a stirrer and a dehydrator, 500 parts of methylethylketone, 200 parts of the [noncrystalline part (b-22)] and 720 parts of the [crystalline part (a-21)] were charged, and allowed to react at 80° C. for 5 hours, and the solvent was removed at 80° C., at 20 kPa, to obtain a resin (A-24). The physical property values of the resin (A-24) were described in Table 3.

In a reaction vessel equipped with a stirrer, 300 parts of this resin (A-24), 630 parts of acetone, and 70 parts of ion exchange water were added, and allowed to dissolve, to obtain a resin solution (L-24).

Example 21

In an experiment device of FIG. 1, first, the valves V1, V2 were closed, and carbon dioxide (purity 99.99%) was introduced into the particle collecting vessel T4 from the cylinder B2 using the pump P4 to adjust the pressure and the temperature to 14 MPa and 40° C. Further, the resin solution tank T1 was charged with the resin solution (L-21) obtained in Production Example 27, and the microparticle dispersion liquid tank T2 was charged with the hexane dispersion liquid of the microparticle (D-1) for dispersion produced in Production Example 16.

Next, from the cylinder B1 of liquid carbon dioxide, liquid carbon dioxide was introduced into the dispersion vessel T3 by using the pump P3 and adjusted to a supercritical state (9 MPa, 40° C.), and also the hexane dispersion liquid of the microparticle (D-1) was introduced from the tank T2 using the pump P2.

Next, the resin solution (L-21) was introduced into the dispersion vessel T3 from the tank T1 using the pump P1 while inside the dispersion vessel T3 was stirred at 2000 rpm. The internal pressure of the T3 after introduction was 14 MPa.

The weight ratio of the composition charged into the dispersion vessel T3 is as follows.

| Resin solution (L-21) | 270 parts |
|---|---|
| Hexane dispersion liquid of microparticle (D-1) for dispersion | 45 parts |
| Carbon dioxide | 550 parts |

After introducing the resin solution (L-21), stirring was conducted for 1 minute, to obtain a dispersion in which the resin particle (B-21) was dispersed in supercritical carbon dioxide.

Next, the dispersion of (B-21) was transferred from T3 to T4 by opening the valve V1 and introducing supercritical carbon dioxide from B1 into T3 and T4 using P3. The degree of opening of V2 was adjusted so that the pressure was kept constant during transferring of the dispersion of (B-21) from T3 to T4. This operation was conducted for 30 seconds, and V1 was closed.

Then, carbon dioxide was introduced into the particle collecting vessel T4 from the pressure cylinder B2 using the pump P4 while the pressure was kept at 14 MPa by adjusting the degree of opening of the pressure adjustment valve V2.

By this operation, carbon dioxide containing the solvent was discharged to the solvent trap vessel T5 and the resin particle (B-21) was captured in the filter F1. The operation of introducing carbon dioxide from the pressure cylinder B2 into the particle collecting vessel T4 using the pump P4 was stopped when an amount 5 times the weight of carbon dioxide introduced into the above dispersion vessel T3 was introduced into the particle collecting vessel T4. At the time of this stopping, the operation of replacing carbon dioxide containing a solvent with carbon dioxide not containing a solvent and capturing the resin particle (B-21) in the filter F1 was completed. Further, the pressure adjustment valve V2 was opened little by little, and the internal pressure of the particle collecting vessel was reduced to an atmosphere pressure, and the resin particle (X-21) of the second invention captured in the filter F1 was obtained.

Examples 22 to 25

Resin particles (X-22) to (X-25) of the present invention were obtained in a similar manner to Example 21 except that the resin solution (L-21) was changed to the resin solutions (L-22) to (L-25) obtained in Production Examples 28 to 31.

Example 26 to 30

Electrophotographic toners (X'-21) to (X'-25) of the present invention were obtained in similar manners to Examples 21 to 25 except that coloring resin solutions prepared by mixing each 270 parts of (L-21) to (L-25) with 5 parts of a carbon block processed pigment ("MICROLITH Black C-K" manufactured by Ciba Japan) as a coloring agent were used in place of the resin solutions (L-21) to (L-25).

Comparative Example 21

To a beaker, 97 parts of ion exchange water, 15.4 parts of a water dispersion liquid of the microparticle (D'-1) for dispersion obtained in Production Example 17, 1 part of sodium carboxymethyl cellulose, and 10 parts of a 48.5% aqueous solution of sodium dodecyldiphenylether disulfonate (Eleminol MON-7, manufactured by Sanyo Chemical Industries, Ltd.) were added and dissolved uniformly. Then, 75 parts of the resin solution (L-21) obtained in Production Example 27 was charged under stirring with a TK-type homomixer at 10,000 rpm at 25° C. and stirred for 2 minutes. Then, this mixed liquid was transferred to a recovery flask equipped with a stirring rod and a thermometer, and acetone was distilled away until the concentration was 0.5% or less with elevating the temperature to 35° C., to obtain an aqueous resin dispersion of the resin particle.

Then filtration was executed, and the resultant was dried at 40° C. for 18 hours, to obtain a resin particle (R-21) for comparison with a volatile content of 0.5% or less. Thereafter, the treatment by supercritical carbon dioxide was not conducted, and the physical properties were evaluated.

Comparative Example 22

To a beaker, 97 parts of ion exchange water, 1 part of sodium carboxymethyl cellulose, and 15 parts of a 48.5% aqueous solution of sodium dodecyldiphenylether disulfonate (Eleminol MON-7, manufactured by Sanyo Chemical Industries, Ltd.) were added and dissolved uniformly.

Then, 75 parts of the resin solution (L-21) obtained in Production Example 27 was charged under stirring with a TK-type homomixer at 12,000 rpm at 25° C. and stirred for 2 minutes. Then, this mixed liquid was transferred to a recovery flask equipped with a stirring rod and a thermometer, and acetone was distilled away until the concentration was 0.5% or less with elevating the temperature to 35° C., to obtain an aqueous resin dispersion of the resin particle.

Then filtration was executed, and the resultant was dried at 40° C. for 18 hours, to obtain a resin particle (R-22) for comparison with a volatile content 0.5% or less. Thereafter, the treatment by supercritical carbon dioxide was not conducted, and the physical properties were evaluated.

Comparative Examples 23 and 24

Electrophotographic toners for comparison (R'-21) and (R'-22) were obtained in similar manners to Comparative Examples 21 and 22 except that a coloring resin solution prepared by mixing 75 parts of (L-21) with 1.4 parts of a carbon block processed pigment ("MICROLITH Black C-K" manufactured by Ciba Japan) as a coloring agent was used in place of the resin solution (L-21).

Methods for measuring the melting point (m) and the heat of fusion, a method for evaluating the volume average particle size, a method for evaluating the heat resistant keeping property, and an evaluation of the fixing temperature are as same as those described above.

The fixing temperatures of the electrophotographic toners (X'-21) to (X'-25) of the present invention produced in Examples 26 to 30, and the electrophotographic toners (R'-21) and (R'-22) for comparison produced in Comparative Examples 23 and 24, and heat resistant keeping properties of the resin particles (X-21) to (X-25) of the present invention produced in Examples 21 to 25 and the resin particles (R-21) and (R-22) for comparison produced in Comparison Examples 21 and 22 were measured in the methods as described above. The results are shown in Table 4.

TABLE 4

|  | Example 21 | Example 22 | Example 23 | Example 24 | Example 25 | Comparative Example 21 | Comparative Example 22 |
|---|---|---|---|---|---|---|---|
| Resin particle | (X - 21) | (X - 22) | (X - 23) | (X - 24) | (X - 25) | (R - 21) | (R - 22) |
| Resin | (A - 21) | (A - 22) | (A - 23) | (A - 24) | (A - 25) | (A - 21) | (A - 21) |

TABLE 4-continued

| <Composition> | | | | | | | |
|---|---|---|---|---|---|---|---|
| Crystalline part | (a - 21) | (a - 22) | (a - 23) | (a - 21) | (a - 24) | (a - 21) | (a - 21) |
| Noncrystalline part | (b - 21) | (b - 21) | (b - 21) | (b - 22) | (b - 22) | (b - 21) | (b - 21) |
| Microparticle for dispersion | (D - 1) | (D - 1) | (D - 1) | (D - 1) | (D - 1) | (D' - 1) | Without use |
| <Evaluation of physical property and performance> | | | | | | | |
| Heat of fusion H1 (J/g) | 20 | 24 | 22 | 27 | 26 | 15 | 15 |
| Heat of fusion H2 (J/g) | 0 | 13 | 3 | 22 | 9 | 15 | 15 |
| H2/H1 | 0 | 0.54 | 0.14 | 0.81 | 0.35 | 1.00 | 1.00 |
| Volume average particle size (μm) | 5 | 4 | 5 | 6 | 5 | 5 | 5 |
| Melting point (° C.) | 60 | 59 | 53 | 81 | 72 | 50 | 50 |
| Heat resistant keeping property | Good | Good | Good | Good | Good | Acceptable | Poor |

| | Example 26 | Example 27 | Example 28 | Example 29 | Example 30 | Comparative Example 23 | Comparative Example 24 |
|---|---|---|---|---|---|---|---|
| Electrophotographic toner | (X' - 21) | (X' - 22) | (X' - 23) | (X' - 24) | (X' - 25) | (R' - 21) | (R' - 22) |
| <Evaluation of physical property and performance> | | | | | | | |
| Fixing temperature (° C.) | 110 | 105 | 105 | 110 | 110 | 135 | 115 |

The resin particles and the electrophotographic toners of Examples 21 to 30 were excellent in the heat resistant keeping property and the low temperature fixing property, while the resin particles and the electrophotographic toners of Comparative Examples 21 and 23 exhibited significantly impaired low temperature fixing property. The resin particles and the electrophotographic toners of Comparative Examples 22 and 24 were excellent in the low temperature fixing property, but exhibited significantly impaired heat resistant keeping property.

Industrial Applicability

The resin particles obtained by the production method of the present invention are very useful as base particles of electrophotographic toner because of their excellent heat resistant keeping properties and low temperature fixing properties. Also they are useful as an additive for paints, an additive for cosmetics, an additive for paper coating, a resin for slush molding, a powdery paint, a spacer for production of electronic components, a standard particle for electronic measuring devices, a particle for electronic paper, a carrier for medical diagnosis, a particle for electric viscosity, and resin particles for other molding applications.

Description of Reference Signs

| | |
|---|---|
| T1: | Resin solution tank |
| T2: | Solution tank |
| T3: | Dispersion vessel (maximum use pressure 20 MPa, maximum use temperature 200° C., equipped with a stirrer) |
| T4: | Particle collecting vessel (maximum use pressure 20 MPa, maximum use temperature 100° C.) |
| T5: | Solvent trap |
| F1: | Ceramic filter (mesh: 0.5 μm) |
| B1, B2: | Carbon dioxide cylinder |
| P1, P2: | Solution pump |
| P3, P4: | Carbon dioxide pump |
| V1: | Valve |
| V2: | Pressure adjustment valve |

The invention claimed is:

1. A method for producing a resin particle (X1), comprising:

mixing a solution (L) of a resin (A1) in a solvent (S) with liquid or supercritical carbon dioxide (C), wherein the resin (A1) comprises a block polymer made of a resin constituting a crystalline part (a1) and a resin constituting a noncrystalline part (b), wherein as an essential constitutional component, the resin (a1) is a polyester (p1) not containing an aromatic ring and produced by polycondensation of a polyol component and a polycarboxylic acid component, wherein the resin constituting the noncrystalline part (b) has a glass transition temperature of 40 to 250° C.;

forming a resin particle (B') containing (A1) and (S) in (C);

removing (C) and (S), and obtaining the resin particle (X1), wherein a heat of fusion measured by differential scanning calorimetry (DSC) of the obtained (X1) satisfies the following relational formula (1):

$$0 \leq H2/H1 \leq 0.9 \qquad (1)$$

[wherein H1 represents a measurement value of a heat of fusion (J/g) at the time of the initial temperature elevation measured by DSC; and H2 represents a measurement value of a heat of fusion (J/g) at the time of the second temperature elevation measured by DSC], wherein the resin (A1) satisfies {Requirement 2} |LogG"(x+20)−LogG"(x)|>2.0 [G": loss elastic modulus [Pa]].

2. The production method according to claim 1, wherein the polyester (p1) not containing an aromatic ring is an aliphatic polyester obtained by polycondensation of an aliphatic diol (c11) and an aliphatic dicarboxylic acid (e11).

3. The production method according to claim 1, wherein the resin (A1) is a resin having a melting point (m) of 40 to 110° C., a ratio (s/m) between a softening point (s) [° C.] and a melting point (m) [° C.] of 0.8 to 1.55, a melting starting temperature (x) within a temperature range of (m±20)° C., and satisfying the following requirement:

$$G'(m+20) = 50 \text{ to } 1 \times 10^6 \text{ [Pa]} \qquad \{\text{Requirement 1}\}$$

[G': storage elastic modulus [Pa]].

4. The production method according to claim 2, wherein the resin (A1) is a resin having a melting point (m) of 40 to 110° C., a ratio (s/m) between a softening point (s) [° C.] and a melting point (m) [° C.] of 0.8 to 1.55, a melting starting temperature (x) within a temperature range of (m±20)° C., and satisfying the following requirement:

$G'(m+20)=50$ to $1\times10^6$ [Pa]    {Requirement 1}

[G': storage elastic modulus [Pa]].

5. The production method according to claim 1, wherein the resin (A1) has a ratio [G"(m+30)/G"(m+70)] between a loss elastic modulus G"(m+30) at (m+30)° C. and a loss elastic modulus G"(m+70) at (m+70)° C. [m represents a melting point of the resin (A1)] of 0.05 to 50.

6. The production method according to claim 3, wherein the resin (A1) has a ratio [G"(m+30)/G"(m+70)] between a loss elastic modulus G"(m+30) at (m+30)° C. and a loss elastic modulus G"(m+70) at (m+70)° C. [m represents a melting point of the resin (A1)] of 0.05 to 50.

7. The production method according to claim 1, wherein the resin (A1) is a resin in which the crystalline part (a1) and the noncrystalline part (b) are linearly bound in the following form, and n is an average value that is 0.5 to 3.5:

(a1){-(b)-(a1)}n.

8. The production method according to claim 2, wherein the resin (A1) is a resin in which the crystalline part (a1) and the noncrystalline part (b) are linearly bound in the following form, and n is an average value that is 0.5 to 3.5:

(a1){-(b)-(a1)}n.

9. The production method according to claim 3, wherein the resin (A1) is a resin in which the crystalline part (a1) and the noncrystalline part (b) are linearly bound in the following form, and n is an average value that is 0.5 to 3.5:

(a1){-(b)-(a1)}n.

10. The production method according to claim 5, wherein the resin (A1) is a resin in which the crystalline part (a1) and the noncrystalline part (b) are linearly bound in the following form, and n is an average value that is 0.5 to 3.5:

(a1){-(b)-(a1)}n.

11. The production method according to claim 1, wherein a weight percentage of the crystalline part (a1) in the resin (A1) is 30 to 95%.

12. The production method according to claim 3, wherein a weight percentage of the crystalline part (a1) in the resin (A1) is 30 to 95%.

* * * * *